United States Patent
Kim et al.

(10) Patent No.: US 10,432,904 B2
(45) Date of Patent: Oct. 1, 2019

(54) IMAGE PROCESSING DEVICE AND OPERATIONAL METHOD THEREOF

(71) Applicant: Samsung Electronics Co., Ltd., Gyeonggi-do (KR)

(72) Inventors: Dongsoo Kim, Gyeonggi-do (KR); Hwayong Kang, Gyeonggi-do (KR); Jian Chang, Gyeonggi-do (KR); Youngkwon Yoon, Seoul (KR); Donghoon Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/336,064

(22) Filed: Oct. 27, 2016

(65) Prior Publication Data

US 2017/0118453 A1 Apr. 27, 2017

(30) Foreign Application Priority Data

Oct. 27, 2015 (KR) .................. 10-2015-0149319

(51) Int. Cl.
*H04N 9/73* (2006.01)
*H04N 5/349* (2011.01)
(Continued)

(52) U.S. Cl.
CPC ........... *H04N 9/735* (2013.01); *H04N 5/2257* (2013.01); *H04N 5/232* (2013.01); *H04N 5/349* (2013.01);
(Continued)

(58) Field of Classification Search
CPC ...... H04N 9/735; H04N 5/349; H04N 5/2257; H04N 9/07; H04N 9/045; H04N 5/232; H04N 2209/045
See application file for complete search history.

(56) References Cited

U.S. PATENT DOCUMENTS

| 4,873,657 A | 10/1989 | Komfeld |
| 4,980,758 A | 12/1990 | Matsunawa et al. |

(Continued)

FOREIGN PATENT DOCUMENTS

| EP | 0 758 831 | 2/1997 |
| JP | 2003-163940 | 6/2003 |

(Continued)

OTHER PUBLICATIONS

International Search Report dated Feb. 9, 2017 issued in counterpart application No. PCT/KR2016/012069, 8 pages.

(Continued)

*Primary Examiner* — Shahbaz Nazrul
(74) *Attorney, Agent, or Firm* — The Farrell Law Firm, P.C.

(57) ABSTRACT

An image processing method and device are provided. The image processing device includes an image sensor module including a lens and an image sensor; and a processor configured to obtain, using the image sensor module, a first image having first color information, the first image corresponding to an external object, by; move at least one of the lens and the image sensor based on a designated pixel unit; obtain, using the image sensor module with the moved at least one of the lens and the image sensor, a second image having second color information, the second image corresponding to the external object; and generate a third image having third color information based on the first color information and the second color information, the third image corresponding to the external object.

16 Claims, 25 Drawing Sheets

(51) Int. Cl.
  *H04N 5/225*   (2006.01)
  *H04N 9/07*    (2006.01)
  *H04N 9/04*    (2006.01)
  *H04N 5/232*   (2006.01)

(52) U.S. Cl.
  CPC .............. *H04N 9/045* (2013.01); *H04N 9/07* (2013.01); *H04N 2209/045* (2013.01)

(56) References Cited

U.S. PATENT DOCUMENTS

| | | | |
|---|---|---|---|
| 6,018,363 A | 1/2000 | Horii | |
| 8,854,509 B2 | 10/2014 | Bae et al. | |
| 2006/0002693 A1* | 1/2006 | Ogawa | G03B 17/02 396/54 |
| 2008/0030803 A1 | 2/2008 | Min et al. | |
| 2008/0068474 A1 | 3/2008 | Sakamoto | |
| 2009/0295950 A1 | 12/2009 | Abe | |
| 2010/0103294 A1 | 4/2010 | Min et al. | |
| 2012/0105691 A1* | 5/2012 | Waqas | G06T 3/4015 348/280 |
| 2016/0366340 A1* | 12/2016 | Okamoto | H04N 5/23293 |

FOREIGN PATENT DOCUMENTS

| | | |
|---|---|---|
| JP | 2009-055273 | 3/2009 |
| KR | 100821346 | 4/2008 |
| WO | WO 2012/084531 | 6/2012 |

OTHER PUBLICATIONS

European Search Report dated Aug. 13, 2018 issued in counterpart application No. 16860193.8-1208, 10 pages.
European Search Report dated May 22, 2019 issued in counterpart application No. 16860193.8-1208, 5 pages.

\* cited by examiner

FIG.8A

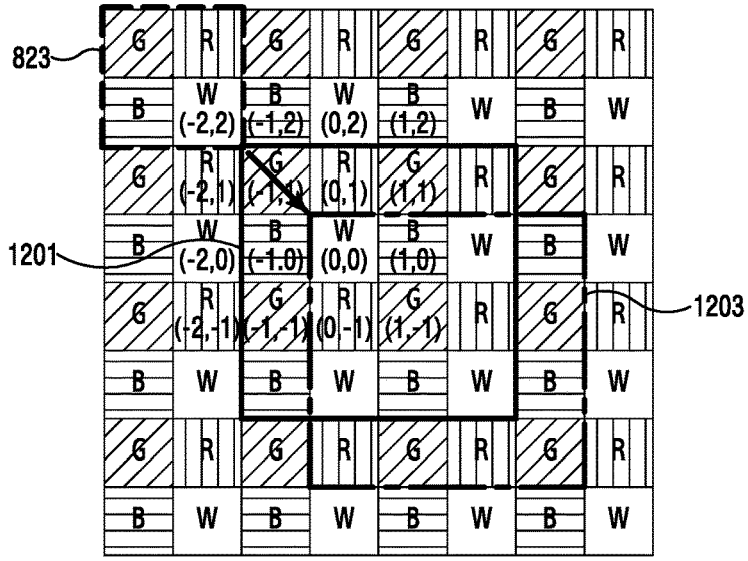
FIG.12A
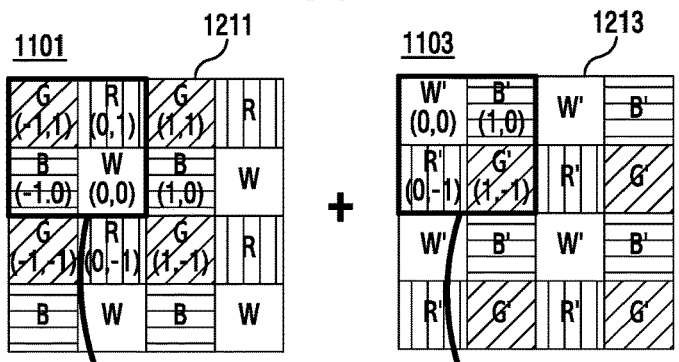
FIG.12B    FIG.12C
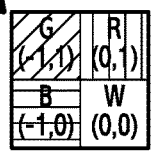    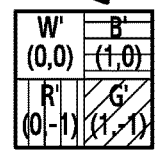
FIG.12D    FIG.12E
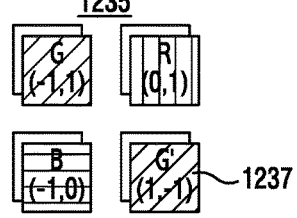
FIG.12F

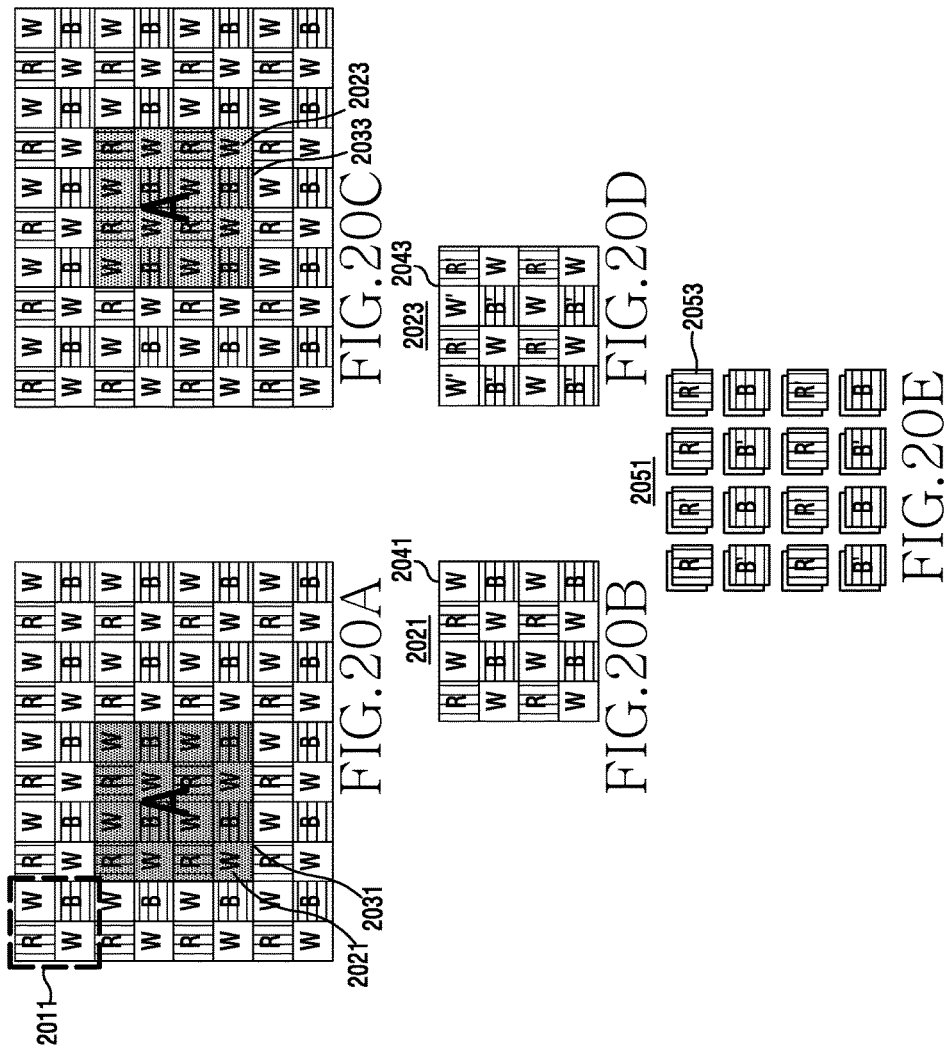

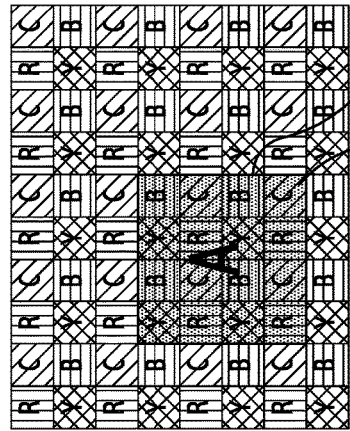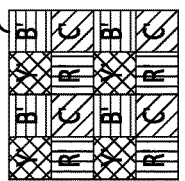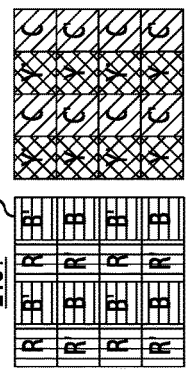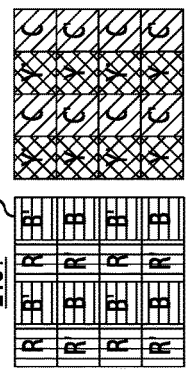
FIG. 21A  FIG. 21B  FIG. 21C  FIG. 21D  FIG. 21E

IMAGE PROCESSING DEVICE AND OPERATIONAL METHOD THEREOF

PRIORITY

This application claims priority under 35 U.S.C. § 119(a) to Korean Patent Application Serial No. 10-2015-0149319, which was filed in the Korean Intellectual Property Office on Oct. 27, 2015, the entire content of which is incorporated herein by reference.

BACKGROUND

1. Field of the Disclosure

The present disclosure relates generally to an image processing device including an image sensor and an operational method thereof.

2. Description of the Related Art

An electronic device may include an image sensor, and therefore, may provide a photographing function, in addition to a message transmission/reception function.

An image sensor may convert a received optical signal into an electric signal using pixel sensors. The pixel sensors may be arranged in a pixel array of a predetermined color pattern. For example, pixel sensors of an image sensor may be red (R), green (G), and blue (B) pixel sensors, and the R, G, and B pixel sensors may be arranged in a pixel array of a predetermined color pattern.

The pixel sensors may also be arranged in a pixel array of a predetermined color and brightness pattern. For example, pixel sensors of an image sensor may be red (R), green (G), blue (B), and white (W) pixel sensors, and the R, G, B, and W pixel sensors may be arranged in a pixel array of a predetermined pattern.

However, an image obtained through an image sensor in which color and white pixel sensors are arranged in a predetermined pattern may be disadvantageous from the perspective of color reproduction and/or color resolution.

SUMMARY

Accordingly, the present disclosure is made to address at least the disadvantages described above and to provide at least the advantages described below.

An aspect of the present disclosure is to provide an image of which color reproduction or color resolution is improved in an electronic device (e.g., an image processing device) including an image sensor.

Another aspect of the present disclosure is to obtain a plurality of images by driving an image sensor module based on a pixel unit in an image processing device including an image sensor.

Another aspect of the present disclosure is to provide an image of which color representation is improved, based on color information of images.

In accordance with an aspect of the present disclosure, an image processing device is provided, which includes an image sensor module including a lens and an image sensor; and a processor configured to obtain, using the image sensor module, a first image having first color information, the first image corresponding to an external object, by; move at least one of the lens and the image sensor based on a designated pixel unit; obtain, using the image sensor module with the moved at least one of the lens and the image sensor, a second image having second color information, the second image corresponding to the external object; and generate a third image having third color information based on the first color information and the second color information, the third image corresponding to the external object.

In accordance with another aspect of the present disclosure, a method is provided for an image processing device that includes an image sensor module and a processor. The method includes obtaining, using the image sensor module, which includes a lens and an image sensor, a first image having first color information, the first image corresponding to an external object; moving at least one of the lens and the image sensor based on a designated pixel unit; obtaining, using the image sensor module with the moved at least one of the lens and the image sensor, a second image having second color information, the second image corresponding to the external object; and generating, by using the processor, a third image having third color information based on at least the first color information and the second color information, the third image corresponding to the external object.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 8A and 8B illustrate a pixel array included in an image sensor of an electronic device according to an embodiment of the present disclosure;

FIGS. 12A to 12F illustrate an operational method of an electronic device according to an embodiment of the present disclosure;

FIGS. 13A to 13F illustrate an operational method of an electronic device according to an embodiment of the present disclosure;

FIGS. 15A to 15F illustrate an operational method of an electronic device according to an embodiment of the present disclosure;

FIGS. 17A to 17D illustrate an operational method of an electronic device according to an embodiment of the present disclosure;

FIGS. 20A to 20E illustrate an operational method of an electronic device according to an embodiment of the present disclosure;

FIGS. 21A to 21E illustrate an operational method of an electronic device according to an embodiment of the present disclosure;

DETAILED DESCRIPTION

Figure 1:
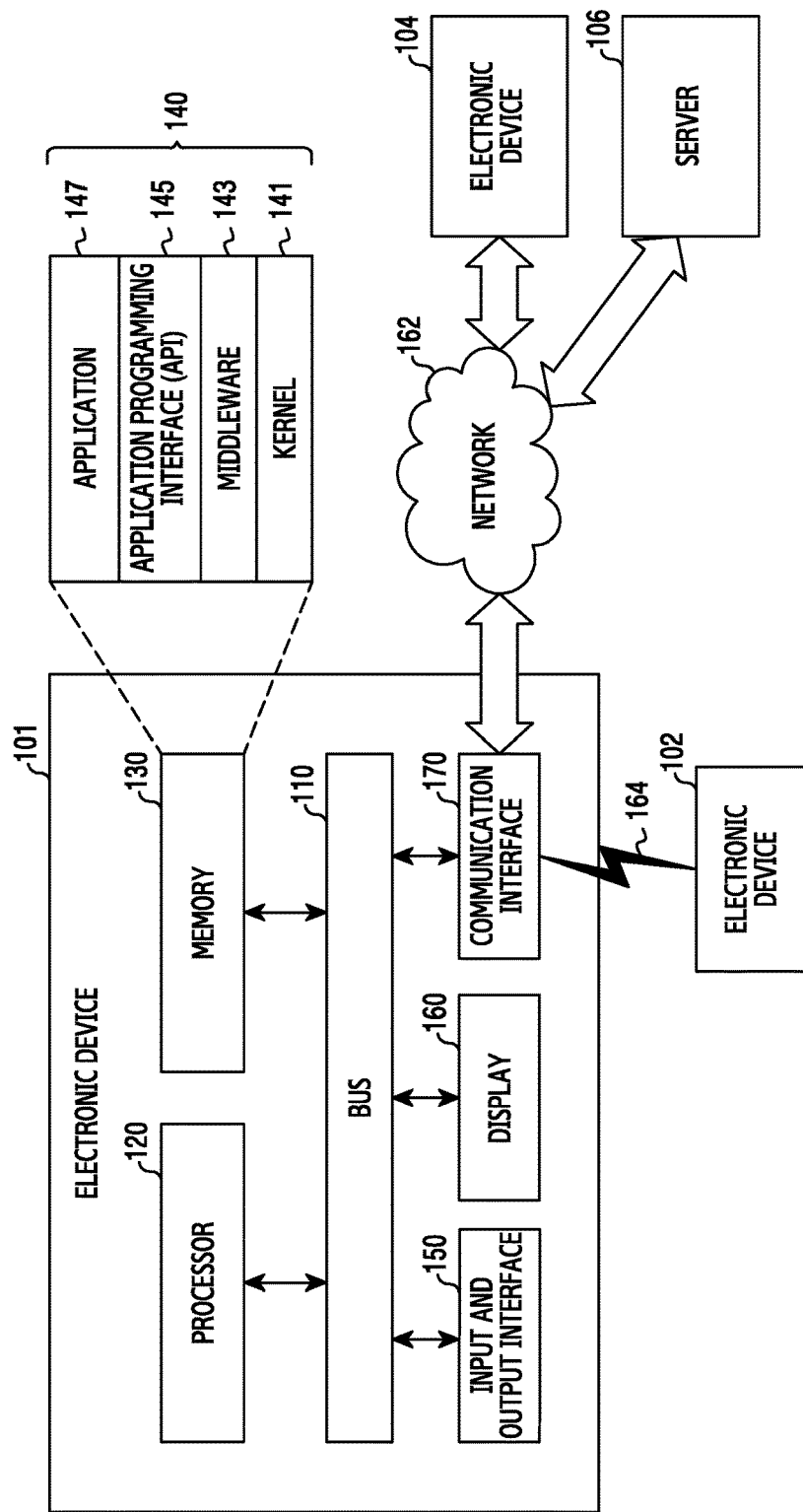
FIG. 1 illustrates a network environment system according to an embodiment of the present disclosure.

Hereinafter, various embodiments of the present disclosure will be described with reference to the accompanying drawings. The embodiments and the terms used herein are not intended to limit the technology disclosed herein to specific forms, and should be understood to include various modifications, equivalents, and/or alternatives to the corresponding embodiments.

In describing the drawings, similar reference numerals may be used to designate similar constituent elements.

Herein, singular forms may include plural forms as well unless the context clearly indicates otherwise.

The expressions "a first", "a second", "the first", or "the second" may modify various components regardless of the order and/or the importance, but do not limit the corresponding components.

When an element (e.g., a first element) is referred to as being "(functionally or communicatively) connected" or "coupled" to another element (e.g., a second element), the first element may be connected directly to the second element or indirectly connected to the second element through yet another element (e.g., a third element). However, when the first element is referred to as being "directly connected" or "directly coupled" to the second element, there may be no other element therebetween.

The expression "configured to" may be interchangeably used with "suitable for", "having the capacity to", "designed to", "adapted to", "made to", or "capable of" in terms of hardware or software, according to circumstances. Further, the expression "a device configured to" may indicate that the device, together with other devices or components, "is able to". For example, "a processor adapted (or configured) to perform A, B, and C" may indicate a dedicated processor (e.g., an embedded processor) for performing only the corresponding operations or a generic-purpose processor (e.g., a central processing unit (CPU) or an application processor (AP)) that may perform at least the corresponding operations by executing one or more software programs stored in a memory device.

Herein, an electronic device may include a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multi-media player (PMP), an MPEG-1 audio layer-3 (MP3) player, a mobile medical device, a camera, a wearable device, etc. For example, the wearable device may include an accessory type device, such as a watch, a ring, a bracelet, an anklet, a necklace, a glasses, a contact lens, or a head-mounted device (HMD), a fabric or clothing integrated type device, such as electronic clothing, a body-mounted type device, such as a skin pad or a tattoo, and a bio-implantable type device, such as an implantable circuit.

The electronic device may also include a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

The electronic device may also a medical device, such as a portable medical measuring device (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine, a navigation device, a global positioning system (GPS) receiver, an event data recorder (EDR), a flight data recorder (FDR), a vehicle infotainment device, an electronic device for a ship (e.g., a navigation device for a ship and a gyro-compass), an avionics device, a security device, an automotive head unit, a robot for home or industry, an automatic teller machine (ATM), a point of sales (POS) device, or an Internet of things (IoT) device (e.g., a light bulb, various sensors, an electric or gas meter, a sprinkler device, a fire alarm, a thermostat, a streetlamp, a toaster, a sporting goods, a hot water tank, a heater, a boiler, etc.).

The electronic device may also include a part of furniture or a building/structure, an electronic board, an electronic signature receiving device, a projector, and/or a type of measuring instrument (e.g., a water meter, an electric meter, a gas meter, a radio wave meter, etc.).

The electronic device may be flexible device.

The electronic device may be a combination of one or more of the aforementioned various devices.

Of course, the electronic device is not limited to one of the above described devices.

Herein, the term "user" may indicate a person using an electronic device or a device (e.g., an artificial intelligence electronic device) using an electronic device.

FIG. 1 illustrates a network environment system according to an embodiment of the present disclosure.

Referring to FIG. 1, an electronic device 101 includes a bus 110, a processor 120, a memory 130, an input/output interface 150, a display 160, and a communication interface 170. Alternatively, the electronic device 101 may omit at least one of the elements illustrated therein, and/or may further include other elements.

The bus 110 may include a circuit that interconnects the processor 120, the memory 130, the input/output interface 150, the display 160, and the communication interface 170 and transfers communication (e.g., control messages or data) between these elements.

The processor 120 may include one or more of a CPU, an AP, and a communication processor (CP). For example, the processor 120 may carry out operations or data processing related to the control and/or communication of at least one other element of the electronic device 101.

The memory 130 may include a volatile and/or non-volatile memory. The memory 130 may store instructions or data relating to at least one other element of the electronic device 101. The memory 130 stores software and/or a program 140.

The program 140 includes a kernel 141, middleware 143, an application programming interface (API) 145, and application programs (or "applications") 147. At least a part of the kernel 141, the middleware 143, or the API 145 may be referred to as an operating system (OS).

The kernel 141 may control or manage system resources (e.g., the bus 110, the processor 120, or the memory 130) used for executing an operation or function implemented by other programs (e.g., the middleware 143, the API 145, or the applications 147). Further, the kernel 141 may provide an interface through which the middleware 143, the API 145, or the applications 147 may access the individual elements of the electronic device 101 to control or manage the system resources.

The middleware 143 may function as an intermediary for allowing the API 145 or the applications 147 to communicate with the kernel 141 to exchange data. The middleware 143 may process one or more task requests, which are received from the applications 147, according to priorities thereof. For example, the middleware 143 may assign priorities for using the system resources (e.g., the bus 110, the processor 120, the memory 130, etc.) of the electronic device 101 to one or more of the applications 147, and may process the one or more task requests.

The API 145 is an interface used by the applications 147 to control a function provided from the kernel 141 or the middleware 143, and may include at least one interface or function (e.g., an instruction) for file control, window control, image processing, text control, etc. For example, the input/output interface 150 may forward instructions or data, which is input from a user or an external device, to the other element(s) of the electronic device 101, or may output instructions or data, which is received from the other element(s) of the electronic device 101, to a user or the external device.

The display 160 may include a liquid crystal display (LCD), a light emitting diode (LED) display, an organic light emitting diode (OLED) display, a micro electro mechanical system (MEMS) display, or an electronic paper display. The display 160 may display various types of content (e.g., text, images, videos, icons, and/or symbols) to a user. The display 160 may include a touch screen, and may receive a touch input, a gesture input, a proximity input, or a hovering input using an electronic pen or a user's body part.

The communication interface 170 may establish communication between the electronic device 101 and a first external electronic device 102, a second external electronic device 104, and/or a server 106. For example, the communication interface 170 may be connected to a network 162 through wireless or wired communication to communicate with the second external electronic device 104 or the server 106.

The wireless communication may include cellular communication that uses at least one of long term evolution (LTE), LTE-Advance (LTE-A), code division multiple access (CDMA), wideband CDMA (WCDMA), universal mobile telecommunications system (UMTS), wireless broadband (WiBro), global system for mobile communications (GSM), etc. The wireless communication may also include WiFi, Bluetooth, Bluetooth low energy (BLE), Zigbee, near field communication (NFC), magnetic secure transmission, radio frequency (RF), body area network (BAN), etc. The wireless communication may also include global navigation satellite system (GNSS), e.g., a GPS, a global navigation satellite system (Glonass), a Beidou navigation satellite system, or Galileo (i.e., the European global satellite-based navigation system). Herein, "GPS" may be interchangeably used with "GNSS".

The wired communication may include a universal serial bus (USB), a high definition multimedia interface (HDMI), recommended standard 232 (RS-232), power line communication, and a plain old telephone service (POTS).

The network 162 may include a telecommunications network, for example, a computer network (e.g., a local area network (LAN) or a wide area network (WAN)), the Internet, and/or a telephone network.

Each of the first and second external electronic devices 102 and 104 may be of a type identical to or different from that of the electronic device 101.

All or some of the operations performed by the electronic device 101 may be performed the first external electronic device 102, the second external electronic device 104 and/or the server 106. For example, when the electronic device 101 has to perform some functions or services automatically or by request, the electronic device 101 may request the first external electronic device 102, the second external electronic device 104 and/or the server 106 to perform at least some functions relating thereto instead of, or in addition to, performing the functions or services by itself. The first external electronic device 102, the second external electronic device 104 and/or the server 106 may execute the requested functions or the additional functions, and may deliver the result of the execution to the electronic device 101. The electronic device 101 may provide the received result as is, or may additionally process the received result to provide the requested functions or services. To this end, cloud computing, distributed computing, and/or client-server computing technology may be used.

Figure 2:
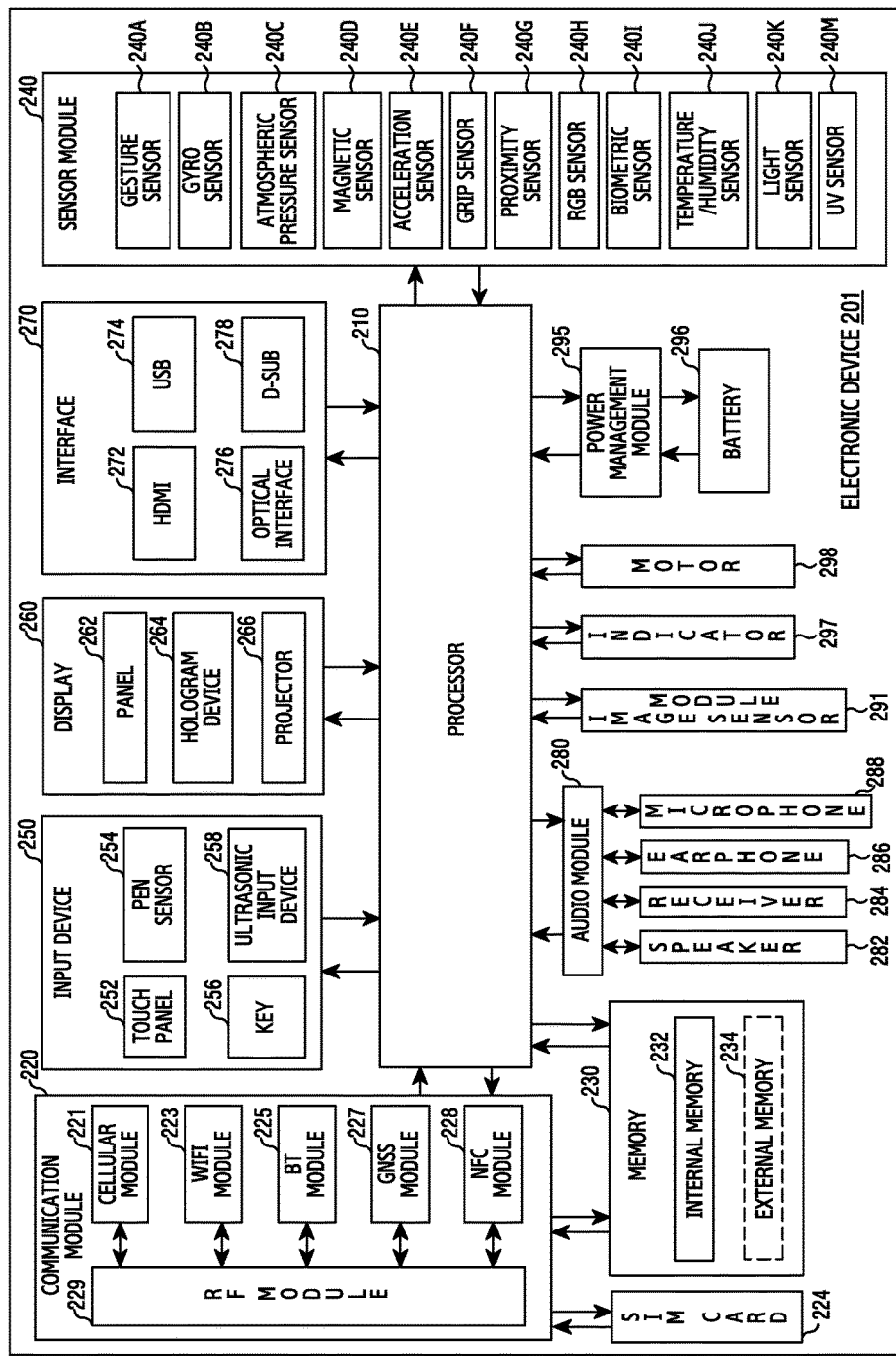
FIG. 2 illustrates an electronic device according to an embodiment of the present disclosure.

FIG. 2 illustrates an electronic device according to an embodiment of the present disclosure.

Referring to FIG. 2, the electronic device 201 includes a processor 210 (e.g., an AP), a communication module 220, a subscriber identification module (SIM) card 224, a memory 230, a sensor module 240, an input device 250, a display 260, an interface 270, an audio module 280, an image sensor module 291, a power management module 295, a battery 296, an indicator 297, and a motor 298.

The processor 210 may drive an OS or application programs to control a plurality of hardware or software elements connected thereto and may perform various types of data processing and operations. For example, the processor 210 may be embodied as a system on chip (SoC). The processor 210 may further include a graphic processing unit (GPU) and/or an image signal processor. The processor 210 may also include at least some of the elements illustrated in FIG. 2 (e.g., a cellular module 221). The processor 210 may load, in a volatile memory, instructions or data received from at least one of the other elements (e.g., a non-volatile memory), may process the loaded instructions or data, and may store result data in the non-volatile memory.

The communication module 220 includes the cellular module 221, a WiFi module 223, a Bluetooth module 225, a GNSS module 227, an NFC module 228, and an RF module 229.

The cellular module 221 may provide a voice call, a video call, a text message service, an Internet service, etc., through a communication network. The cellular module 221 may identify and authenticate the electronic device 201 within a communication network using the SIM card 224. The cellular module 221 may perform at least some of the functions that the processor 210 may provide. The cellular module 221 may include a CP.

At least two of the cellular module 221, the Wi-Fi module 223, the BT module 225, the GNSS module 227, and the NFC module 228 may be included in one Integrated chip (IC) or IC package.

The RF module 229 may transmit/receive a communication signal (e.g., an RF signal). The RF module 229 may include a transceiver, a power amp module (PAM), a frequency filter, a low noise amplifier (LNA), an antenna, etc.

At least one of the cellular module 221, the WiFi module 223, the BT module 225, the GNSS module 227, and the NFC module 228 may transmit/receive an RF signal through a separate RF module.

The SIM card 224 may be an embedded SIM, and may contain unique identification information (e.g., an integrated circuit card identifier (ICCID)) or subscriber information (e.g., international mobile subscriber identity (IMSI)).

The memory 230 includes an embedded memory 232 and an external memory 234. The embedded memory 232 may include at least one of a volatile memory (e.g., a dynamic random access memory (DRAM), a static random access memory (SRAM), a synchronous DRAM (SDRAM), etc.) and a non-volatile memory (e.g., an one time programmable read only memory (ROM) (OTPROM), a programmable ROM (PROM), an erasable PROM (EPROM), an electrically erasable PROM (EEPROM), a mask ROM, a flash ROM, a flash memory, a hard disc drive, or a solid state drive (SSD)).

The external memory 234 may include a flash drive, a compact flash (CF), a secure digital (SD), a Micro-SD, a Mini-SD, an eXtreme digital (xD), a multi-media card (MMC), a memory stick, etc. The external memory 234 may be functionally or physically connected to the electronic device 201 through various interfaces.

The sensor module 240 may measure a physical quantity or detect the operating state of the electronic device 201, and may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an RGB sensor), a biometric sensor 240I, a temperature/humidity sensor 240J, an illumination (or light) sensor 240K, and a ultraviolet (UV) sensor 240M.

Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may also include a control circuit for controlling one or more sensors included therein.

The electronic device 201 may also include a processor configured to control the sensor module 240 as a part of, or separately from, the processor 210 and may control the sensor module 240 while the processor 210 is in a sleep state.

The input device 250 includes a touch panel 252, a (digital) pen sensor 254, a key 256, and an ultrasonic input device 258. The touch panel 252 may be at least one of a capacitive type, a resistive type, an infrared type, and an ultrasonic type. Further, the touch panel 252 may further include a control circuit. The touch panel 252 may further include a tactile layer to provide a tactile reaction to a user.

The (digital) pen sensor 254 may include a recognition sheet that is a part of, or separate from, the touch panel.

The key 256 may include a physical button, an optical key, or a keypad.

The ultrasonic input device 258 may detect ultrasonic waves, which are generated by an input tool, through a microphone 288 to determine data corresponding to the detected ultrasonic waves.

The display 260 includes a panel 262, a hologram device 264, a projector 266, and/or a control circuit for controlling the panel 262, the hologram device 264, and/or the projector 266.

The panel 262 may be implemented to be flexible, transparent, and/or wearable. The panel 262, together with the touch panel 252, may be configured as one or more modules.

The hologram device 264 may show a three-dimensional image in the air using interference of light.

The projector 266 may display an image by projecting light onto a screen. The screen may be located in the interior of, or on the exterior of, the electronic device 201.

The interface 270 includes an HDMI 272, a USB 274, an optical interface 276, and a D-subminiature (D-sub) 278. Additionally or alternatively, the interface 270 may include a mobile high-definition link (MHL) interface, an SD card/multi-media card (MMC) interface, or an infrared data association (IrDA) standard interface.

The audio module 280 may convert a sound into an electrical signal, and vice versa. The audio module 280 may process sound information that is input or output through, for example, a speaker 282, a receiver 284, earphones 286, the microphone 288, etc.

The image sensor module 291 is a device that may photograph a still image and a moving image. The image sensor module 291 may include one or more image sensors (e.g., a front sensor or a back sensor), a lens, an image signal processor (ISP), or a flash (e.g., an LED or xenon lamp).

The power management module 295 may manage the power of the electronic device 201. The power management module 295 may include a power management integrated circuit (PMIC), a charger IC, and/or a battery gauge.

The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included.

The battery gauge may measure the residual quantity of the battery 296 and a voltage, current, and/or temperature while charging.

The battery 296 may include a rechargeable battery and/or a solar battery.

The indicator 297 may display a particular state, e.g., a booting state, a message state, a charging state, etc., of the electronic device 201 or a part (e.g., the processor 210) of the electronic device 201.

The motor 298 may convert an electrical signal into a mechanical vibration and may generate a vibration, a haptic effect, etc.

The electronic device 201 may include a mobile TV support device (e.g., a GPU) that may process media data according to a standard, such as digital multimedia broadcasting (DMB), digital video broadcasting (DVB), mediaFlo™, etc.

Each of the above-described component elements of hardware according to the present disclosure may be configured with one or more components, and the names of the corresponding component elements may vary based on the type of electronic device.

Further, the electronic device 201 may omit some elements and/or may include additional elements, and some of the elements of the electronic device may be combined with each other to configure one entity, in which case the electronic device may identically perform the functions of the corresponding elements prior to the combination.

Figure 3:
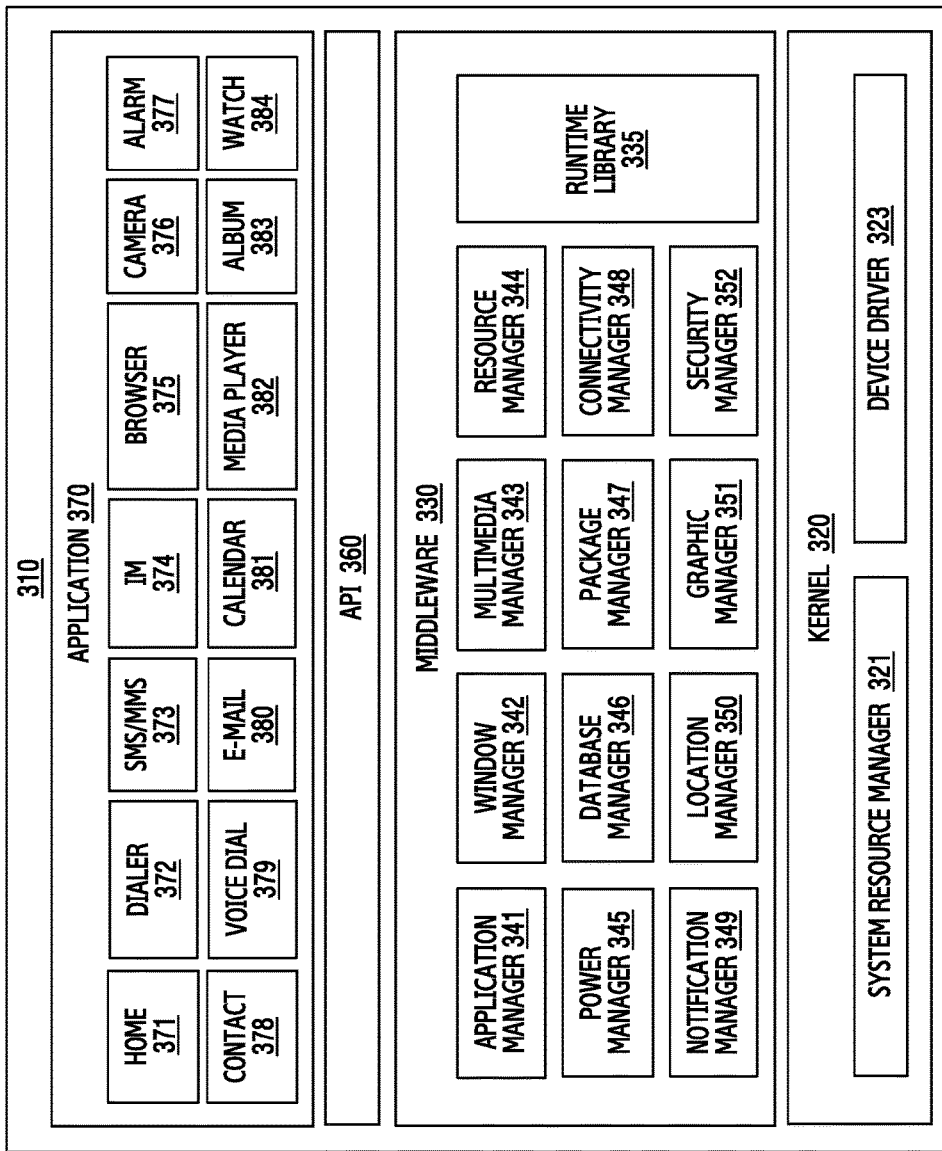
FIG. 3 illustrates a programming module according to an embodiment of the present disclosure.

FIG. 3 illustrates a program module according to an embodiment of the present disclosure.

Referring to FIG. 3, the program module 310 may include an OS that controls resources related to an electronic device and/or various applications that are driven on the operating system. The operating system may include, for example, Android®, iOS®, Windows®, Symbian®, Tizen®, or Bada®.

The program module 310 includes a kernel 320, middleware 330, an API 360, and applications 370. At least a part of the program module 310 may be preloaded on an electronic device, or may be downloaded from an external electronic device.

The kernel 320 includes a system resource manager 321 and a device driver 323.

The system resource manager 321 may control, allocate, or retrieve system resources. The system resource manager 321 may include a process manager, a memory manager, and/or a file system manager.

The device driver 323 may include a display driver, a camera driver, a Bluetooth driver, a shared memory driver, a USB driver, a keypad driver, a WiFi driver, an audio driver, and/or an Inter-Process Communication (IPC) driver.

For example, the middleware 330 may provide a function required by the applications 370 in common, or may provide various functions to the applications 370 through the API 360 to enable the applications 370 to use the limited system resources within the electronic device. The middleware 330 includes a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may manage an input/output, manage a memory, or process an arithmetic function.

The application manager 341 may manage the life cycles of the applications 370.

The window manager 342 may manage graphic user interface (GUI) resources used for a screen.

The multimedia manager 343 may recognize formats required for reproducing various media files and may encode or decode a media file using a codec suitable for a corresponding format.

The resource manager 344 may manage the source codes of the applications 370 or the space of a memory.

The power manager 345 may manage the capacity or power of a battery, and may provide power information required for operating the electronic device. The power manager 345 may operate in conjunction with a basic input/output system (BIOS).

The database manager 346 may generate, search, or change databases to be used by the applications 370.

The package manager 347 may manage the installation or updating of an application that is distributed in the form of a package file.

The connectivity manager 348 may manage a wireless connection.

The notification manager 349 may provide an event (e.g., an arrival message, an appointment, a proximity notification, etc.) to a user.

The location manager 350 may manage the location information of the electronic device.

The graphic manager 351 may manage a graphic effect to be provided to a user, or a user interface relating thereto.

The security manager 352 may provide system security or user authentication.

The middleware 330 may include a telephony manager for managing a voice or video call function of the electronic device or a middleware module that is capable of forming a combination of the functions of the above-described elements. The middleware 330 may provide a specialized module for each type of operation system. The middleware 330 may dynamically remove some of the existing elements, or may add new elements.

The API 360 may be a set of API programming functions, and may be provided with different configurations according to operating systems. For example, in the case of Android® or iOS®, one API set may be provided for each platform, and in the case of Tizen®, two or more API sets may be provided for each platform.

The applications 370 include a home application 371, a dialer application 372, a short message service/multimedia message service (SMS/MMS) application 373, an instant message (IM) application 374, a browser application 375, a camera application 376, an alarm application 377, a contacts application 378, a voice dial application 379, an e-mail application 380, a calendar application 381, a media player application 382, an album application 383, and a watch application 384. Additionally or alternatively, the applications 370 may include a health care application (e.g., an application for measuring exercise quantity or blood glucose), or an application that provides environment information (e.g., an application that measure and provides atmospheric pressure, humidity, or temperature information).

The applications 370 may include an information exchange application that may support exchanging information between the electronic device and an external electronic device. The information exchange application may include a notification relay application for relaying predetermined information to an external electronic device, or a device management application for managing an external electronic device. For example, the notification relay application may relay notification information generated in the other applications of the electronic device to an external electronic device, or may receive notification information from an external electronic device to provide the received notification information to a user.

The device management application may install, delete, or update functions of an external electronic device that communicates with the electronic device (e.g., turning on/off the external electronic device itself (or some elements thereof) or adjusting the brightness (or resolution) of a display) or applications executed in the external electronic device.

The applications 370 may include applications (e.g., a health care application of a mobile medical appliance) that are designated according to the attributes of an external electronic device.

The applications 370 may be received from an external electronic device.

At least some of the program module 310 may be embodied (executed) as software, firmware, hardware, or a combination thereof, and may include a module, a program, a routine, an instruction set, or a process for implementing one or more functions.

Herein, the term "module may include a unit consisting of hardware, software, or firmware, and may be used interchangeably with the term "logic", "logical block", "component", "circuit", etc. A "module" may be an integrated component, or a minimum unit for performing one or more functions or a part thereof. A "module" may be mechanically or electronically implemented and may include, e.g., an application-specific integrated circuit (ASIC) chip, a field-programmable gate array (FPGA), or a programmable-logic device, which has been known or are to be developed in the future, for performing certain operations.

At least some of devices (e.g., modules or functions thereof) or methods (e.g., operations) according to the various embodiments described herein may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code which is made by a compiler or a code which may be executed by an interpreter.

Herein, the term "pixel sensor" may be interchangeably used with the term "pixel".

Figure 4:
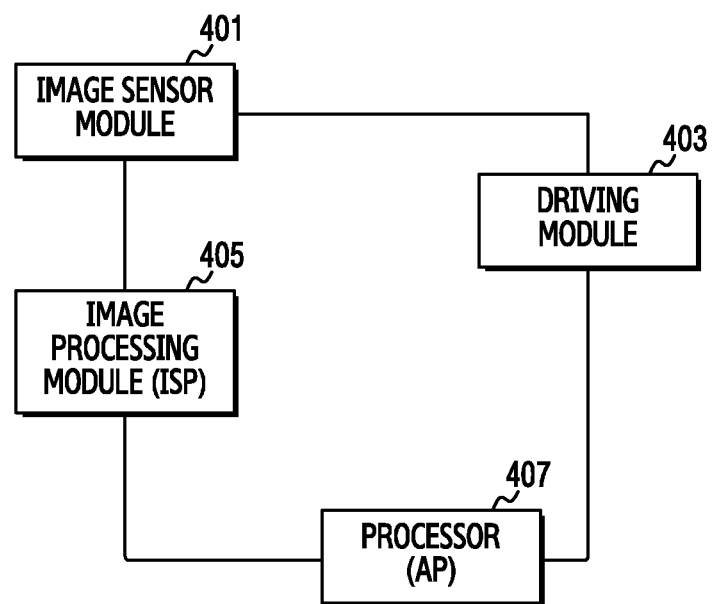
FIG. 4 illustrates an electronic device according to an embodiment of the present disclosure.

FIG. 4 illustrates an electronic device according to an embodiment of the present disclosure.

Referring to FIG. 4, an electronic device (e.g., an image processing device) includes an image sensor module 401, a driving module 403, an image processing module 405, and a processor 407.

The image sensor module 401 may include a lens and an image sensor. The image sensor module 401 may obtain an image corresponding to an external object. The image sensor may include a pixel sensor that is capable of sensing mixed color information of at least two colors, e.g., white (W) information or brightness information. For example, the image sensor may include a pixel array in which red (R), green (G), and blue (B) pixel sensors and white (W) pixel sensors are arranged in a predetermined pattern.

The driving module 403 may move at least some (e.g., a lens and an image sensor) of the image sensor module 401 based on a pixel unit. The driving module 403 may move the lens and/or the image sensor of the image sensor module 401 based on a designated pixel unit so that some of the images obtained by the image sensor module 401 include different color information. When the image sensor module 401 includes a white pixel or a brightness pixel sensor, the driving module 403 may move the image sensor so that at least some of an image that is moved based on a predetermined pixel unit includes color information of an image that is not moved based on a predetermined pixel unit, and white information has a different pixel location.

The designated pixel unit may be an interval of at least a ½-pixel unit, a 1-pixel unit, or a 2-pixel unit.

The driving module 403 may move the image sensor module 401 based on the movement direction of the image sensor module 401 that is determined by the processor 407. The movement direction of the image sensor module 401 may be the upward direction, the downward direction, the leftward direction, the rightward direction, or a diagonal direction.

The image processing module 405 may process images that are output from an image sensor.

The processor 407 may obtain a property of an external object, settings of an electronic device, or context information associated with an environment around the electronic device. For example, the processor 407 may determine an illuminance condition, an automatic exposure condition, or a setting condition, and may obtain context information. The processor 407 may determine a photographing mode based on the context information. The processor 407 may control a photographing operation by controlling driving of the driving module 403 based on the determined photographing mode.

The image processing module 405 may be included in the image sensor module 401 or in the processor 407. Also, some functions of the image processing module 405 may be prepared in the image sensor module 401, and some other functions of the image processing module 405 may be prepared in the processor 407. When a third image is generated based on a first image and a second image that are obtained from the image sensor module 401, the electronic device (e.g., the processor 407) may process the third image in the image sensor module 401, and may transfer the same to the image processing module 405.

The following descriptions will be provided assuming that the image processing module 405 is included in the processor 407.

The processor 407 may further include a graphic processor module that outputs image data to a display. The processor 407 may process the image output from the image sensor module 401, as a preview image in the display, and may process the image as a still image or a video image under the control of a user, and may store the same in a memory.

Figure 5:
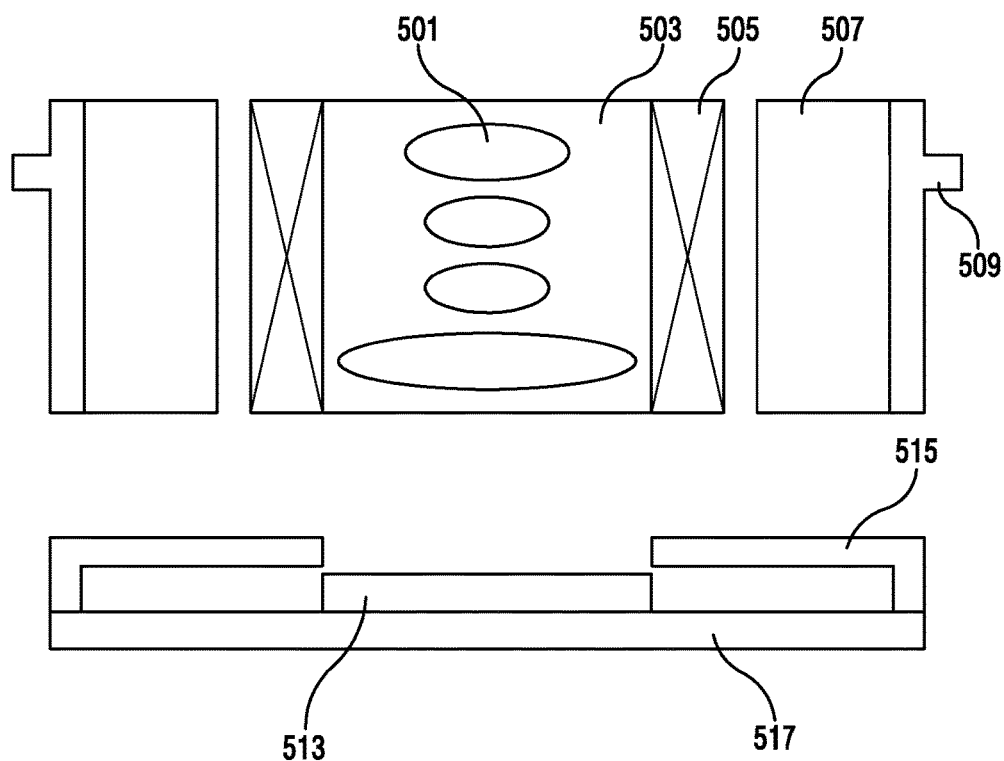
FIG. 5 illustrates an image sensor module of an electronic device according to an embodiment of the present disclosure.

FIG. 5 illustrates an image sensor module of an electronic device according to an embodiment of the present disclosure.

Referring to FIG. 5, the image sensor module includes a cover member 509, a lens 501, a lens barrel 503, a coil part 505, a magnetic part 507, a base 515, an image sensor 513 and a circuit board 517.

The cover member 509 forms the exterior of the image sensor module. The cover member 509 may protect various components disposed on the inside.

The lens 501 may include a plurality of lenses. An image that comes from the lens 501 may be transferred to the image sensor 513.

The lens barrel 503 receives the lens 501.

The coil part 505 is disposed in the external side of the lens barrel 503. The magnetic part 507 may be disposed in a location that corresponds to the coil part 505. The magnetic part 507 may be disposed to face the coil part 505. The electronic device 101 may move the lens 501 through interaction of an electromagnetic field or a magnetic field of the magnetic part 507 and the coil part 505, by using an optical image stabilizer (OIS) driving module, and may make a correction for the shaking of a user. For example, the electronic device may move the lens 501 through the interaction between an electromagnetic field generated from the coil part 505 when power is applied to the coil part 505, and a magnetic field generated from the magnetic part 507. Through the above, the electronic device may sense a wobbly hand of a user, and move the lens 501 in a direction that is opposite to the wobble, thereby preventing image blurring. Alternatively, the electronic device 101 may sense the wobbly hand of a user, and move the image sensor 513 in a direction that is opposite to the wobble, thereby preventing image blurring.

The base 515 may be coupled with the cover member 509. The base 515 may support the lower part of the cover member 509. On the base 515, an infrared ray filter may be additionally disposed in a location corresponding to the image sensor 513. The base 515 may further act as a sensor holder function that protects the image sensor 513.

The image sensor 513 is disposed on the circuit board 517. The image sensor 513 may be electrically connected to the circuit board 517 through wire bonding, or may be connected through flip bonding by using an electro-conductive paste.

The circuit board 517 may include a plurality of circuit patterns, and may transfer a signal converted by the image sensor 513 to the image processing module 405.

The image sensor 513 may include a pixel array in which color pixel sensors and white pixels are arranged in a predetermined pattern. The pixel array may convert an optical image signal of an external object that is incident through the lens 501 into an electrical image signal.

Figure 6:
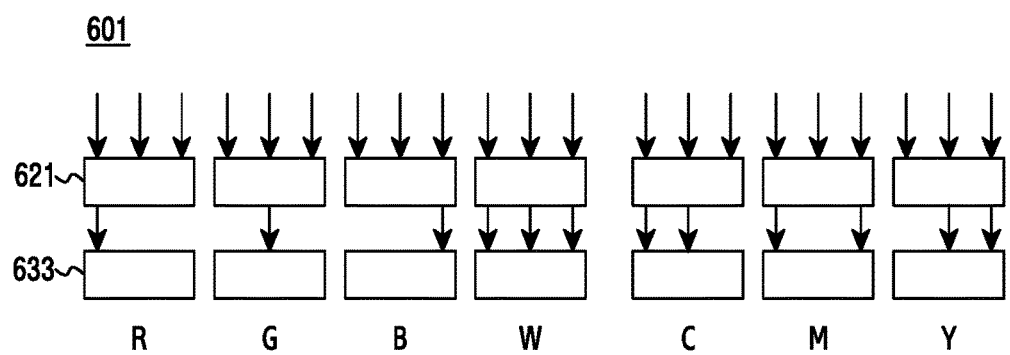
FIG. 6 illustrates pixels included in an image sensor of an electronic device according to an embodiment of the present disclosure.

FIG. 6 illustrates pixels included in an image sensor of an electronic device according to an embodiment of the present disclosure.

Referring to FIG. 6, each pixel 601 may convert an optical signal into an electrical signal. Each pixel 601 may include at least one micro lens, at least one color filter 621, and at least one photodiode 633.

The micro lens may concentrate light that is incident from the outside.

The color filter 621 may include at least one of a red filter, a green filter, a blue filter, a white filter, a cyan filter, a magenta filter, and a yellow filter.

The photo diode 633 converts an optical signal into an electrical signal.

Figure 7:
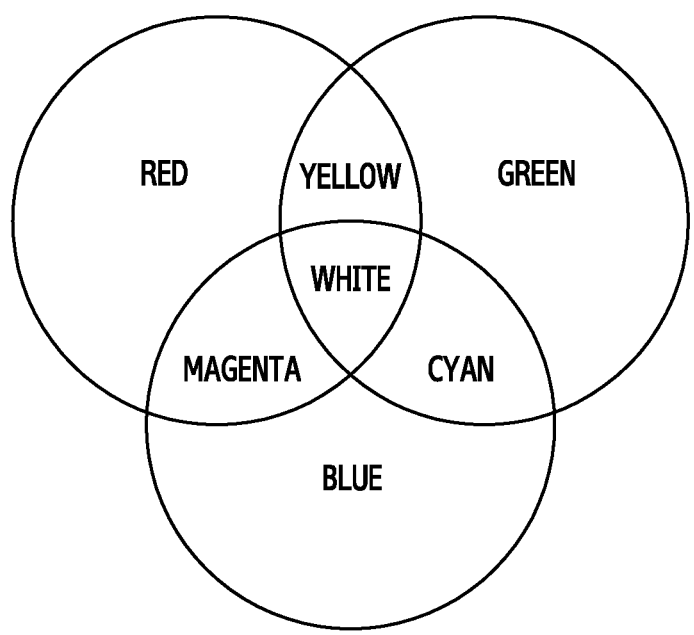
FIG. 7 illustrates pixels included in an image sensor of an electronic device according to an embodiment of the present disclosure.

FIG. 7 illustrates pixels included in an image sensor of an electronic device according to an embodiment of the present disclosure.

As illustrated in FIGS. 6 and 7, the red filter may pass the light of a red wavelength band. For example, an R pixel 601 that includes the red filter may sense red information (hereinafter referred to as "R color information"). The green filter may pass the light of a green wavelength band. For example, a G pixel 601 that includes the green filter may sense green information (hereinafter referred to as "G color information"). The blue filter may pass the light of a blue wavelength band. For example, a B pixel 601 that includes the blue filter may sense blue information (hereinafter referred to as "B color information"). The white filter may pass the light of all of the wavelength bands in a visible light range. For example, a W pixel 601 that includes the white filter may sense brightness information or white information (hereinafter referred to as "W color information"). The cyan filter may pass the light of the green wavelength band and blue wavelength band. For example, a C pixel 601 that includes the cyan filter may sense cyan information (hereinafter referred to as "C color information"), which includes green information and blue information. The magenta filter may pass the light of the red wavelength band and blue wavelength band. For example, an M pixel 601 that includes the magenta filter may sense magenta information (hereinafter referred to as "M color information"), which includes red information and blue information. The yellow filter may pass the light of the red wavelength band and green wavelength band. For example, a Y pixel 601 that includes the yellow filter may sense yellow information (hereinafter referred to as "Y color information"), which includes red information and green information.

Figure 8A:
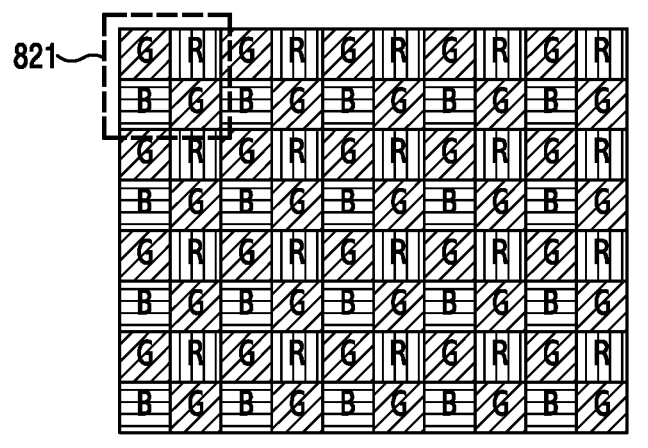
Figure 8B:
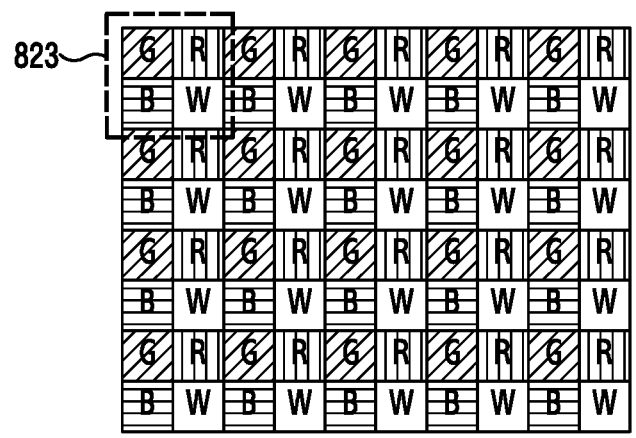

FIGS. 8A and 8B illustrate a pixel array included in an image sensor of an electronic device according to an embodiment of the present disclosure.

A pixel array as illustrated in FIGS. 8A and 8B may be embodied as a charge coupled device (CCD) or a complementary metal oxide semiconductor (CMOS) device. In addition, the pixel array may be an array in which various types of photoelectric conversion devices are arranged in two dimensions. A pixel array may have a structure in which pixels in the same pattern are repeated based on a pixel unit.

A pixel array of FIG. 8A has a pixel array structure of a Bayer pattern, in which an RGB pixel unit 821 having a pattern 821 is repeated. For example, the RGB pixel unit 821 is formed of one R pixel, two G pixels, and one B pixel.

FIG. 8B illustrates a pixel array structure in which color pixels and white pixels are arranged in a predetermined pattern. For example, when four pixels form a single pixel unit 823, the pixel unit 823 includes R, G, and B pixels having color information, and a W pixel having brightness information.

An image obtained from an image sensor that has a pixel array of a Bayer pattern as shown in FIG. 8A may be advantageous from the perspective of resolution and color reproduction. However, an image obtained from the image sensor that has the pixel array of the Bayer pattern is incapable of obtaining an image when photographing is performed at low illuminance, or may involve a lot of noise when photographing is performed at low illuminance and high resolution.

An image sensor that has a pixel array including a white pixel as illustrated in FIG. 8B may be advantageous when photographing is performed at low illuminance. However, the image sensor that has the structure of FIG. 8B may have relatively worse resolution and color reproduction than the image sensor illustrated in FIG. 8A.

Figure 9A:
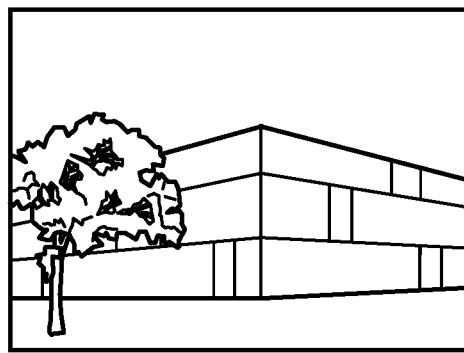
FIGS. 9A and 9B illustrate images output from various image sensors.
Figure 9B:
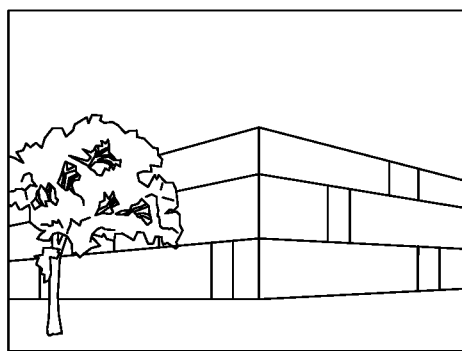

FIGS. 9A and 9B illustrate examples of images that are output from various image sensors.

For example, the image illustrated in FIG. 9A is an example of an image that is output through the image sensor illustrated in FIG. 8A, and the image illustrated in FIG. 9B is an example of an image that is output through the image sensor that has the RGBW pixel unit 823 as illustrated in FIG. 8B. In this instance, the image illustrated in FIG. 9B has lower color reproduction and lower color resolution than the image illustrated in FIG. 9A.

The electronic device may include an image sensor including a pixel array in which color pixels and white pixels are arranged in a predetermined pattern, as illustrated in FIG. 8B. The electronic device may process images generated through the image sensor module, based on a photographing mode, and may improve color reproduction and/or color resolution.

Figure 10:
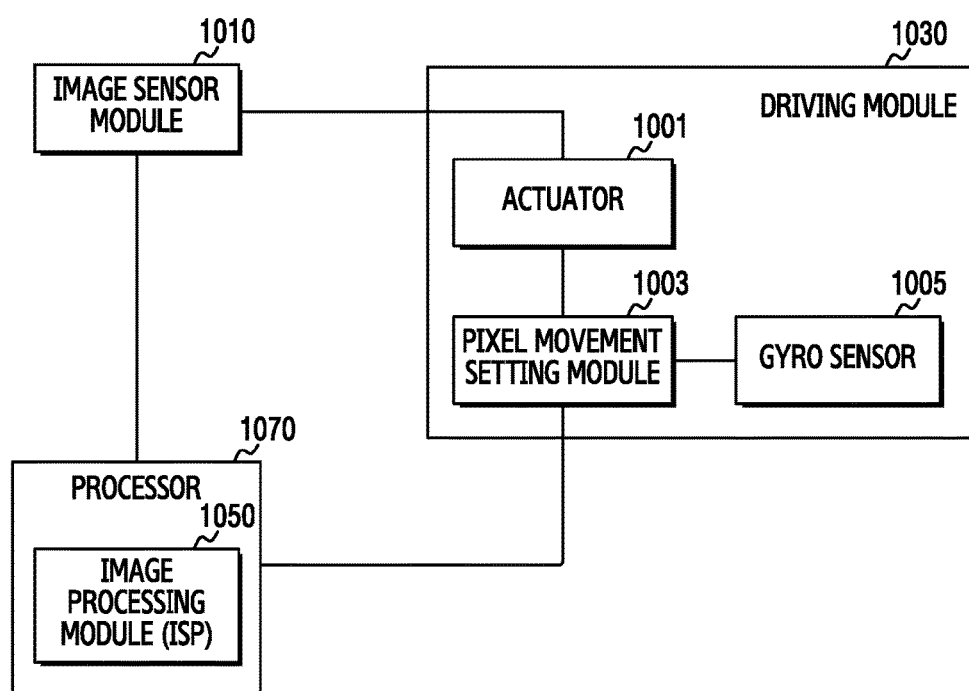
FIG. 10 illustrates an electronic device according to an embodiment of the present disclosure.

FIG. 10 illustrates an electronic device according to an embodiment of the present disclosure.

Referring to FIG. 10, the electronic device includes an image sensor module 1010, a processor 1070, which includes an image processing module 1050, and a driving module 1030.

The driving module 1030 may drive the image sensor module 1010. The driving module 1030 includes an actuator 1001, a pixel movement setting module 1003, and a gyro sensor 1005. The driving module 1030 may include an optical image stabilizer function.

The electronic device may move pixels of images by moving a lens or an image sensor using the actuator 1001. The actuator 1001 may drive the lens or the image sensor based on a predetermined pixel unit, under the control of the processor 1070.

The pixel unit may be defined based on various pixel units, such as a ½-pixel unit, a 1-pixel unit, a 2-pixel unit, etc.

The actuator 1001 may have a pixel shifter function that is capable of moving the image sensor module 1010 in a designated direction and based on a designated pixel unit. The actuator 1001 may perform a pixel shift function in order for the location of a white pixel of an image in which pixel movement is performed in the pixel unit of the image processing module 1050 to be different from the location of the white pixel of the image before the pixel movement is performed, under the control of the processor 1070. For example, when the image sensor has an RGBW pixel pattern, pixel movement is performed so that color information of an RGB Bayer pattern is included when signals of a pixel unit before the pixel movement and a pixel unit after the pixel movement are processed.

The pixel movement setting module 1003 may set a movement direction of a pixel or a movement distance of a pixel unit when pixel movement is performed. The gyro sensor 1005 may sense motion caused by the wobbly hand of a user, and may drive the actuator 1001 through the pixel movement setting module 1003.

The electronic device may perform a pixel shift operation of the image sensor module 1010 by using the actuator 1001. For example, when a second image is obtained, the processor 1070 may output pixel movement control data of a designated unit, to the pixel movement setting module 1003. The pixel movement setting module 1003 may set a movement of a designated pixel unit to the actuator 1001, and the actuator 1001 may move a lens or an image sensor of the image sensor module 1010, based on the designated pixel unit.

The processor 1070 may control operations of the image sensor module 1010 based on a photographing mode. For example, when a photographing mode is a mode for obtaining multiple images, the processor 1070 may obtain a first image having first color information, which corresponds to an external object, through the image sensor module 1010. The processor 1070 may perform pixel shifting on the image sensor module 401 based on a designated pixel unit. The processor 1070 may obtain a second image having second color information, which is moved based on a designated pixel from the obtained first image, and corresponds to the external object. The processor 1070 may generate a third image having third color information, which corresponds to the external object, based on at least the first color information and the second color information by using the first image and the second image.

The image sensor module 1010 may include an image sensor and a lens. Accordingly, the image sensor may include a white (W) pixel or a brightness pixel that is capable of sensing mixed color information including two or more colors. The first color information and the second color information may be mixed color information. For example, the mixed color information may be information in which color pixel information and white pixel information are mixed. For example, the white information may be information in which R pixel information, G pixel information, and B pixel information are mixed.

The processor 1070 may obtain a property of the external object, settings of the electronic device, and context information associated with an environment around the electronic device, and may set a photographing mode that is capable of dynamically adjusting a designated pixel unit based on at least the context information. For example, the electronic device may include a sensor that is capable of sensing the brightness of an ambient environment. The processor 1070 may obtain brightness information of an ambient environment using a sensor, and may set a photographing mode for obtaining a second image based on the obtained brightness information of the adjacent environment.

The processor 1070 may dynamically adjust a pixel unit designated by user's setting in order to obtain an image with a high degree of definition of a G pixel. For example, when the electronic device has W pixel information as first color information, the electronic device may dynamically adjust a designated pixel unit in order to obtain G pixel information as second color information.

The processor 1070 may combine at least some of the first color information and at least some of the second color information, and may generate at least some of third color information.

The driving module 1030 may also be capable of shifting the image sensor or the lens of the image sensor module 1010 based on a designated pixel unit. The processor 1070 may be configured to move the lens or the image sensor based on a designated pixel unit by controlling the driving module 1030 so that at least some of the second color information includes color information different from the at least some of the first color information.

When at least some of the first color information includes white information (that is, when the image sensor module 1010 includes a white pixel), the processor 1070 controls the driving module 1030, and moves the lens or the image sensor of the image sensor module 1010 based on a designated pixel unit so that at least some of the second color information includes color information (e.g., red information, green information, blue information, etc.).

The processor 1070 may move the lens or the image sensor of the image sensor module 1010 based on a designated pixel unit by controlling the driving module 1030 so that at least some of the second color information includes color information of at least some of the first color information in association with the location of the external object.

The processor 1070 may shift a pixel by controlling the driving module 1030 so that the locations of white pixels having white information in the first image and the second image are different from each other in a pixel unit.

Figure 11B:
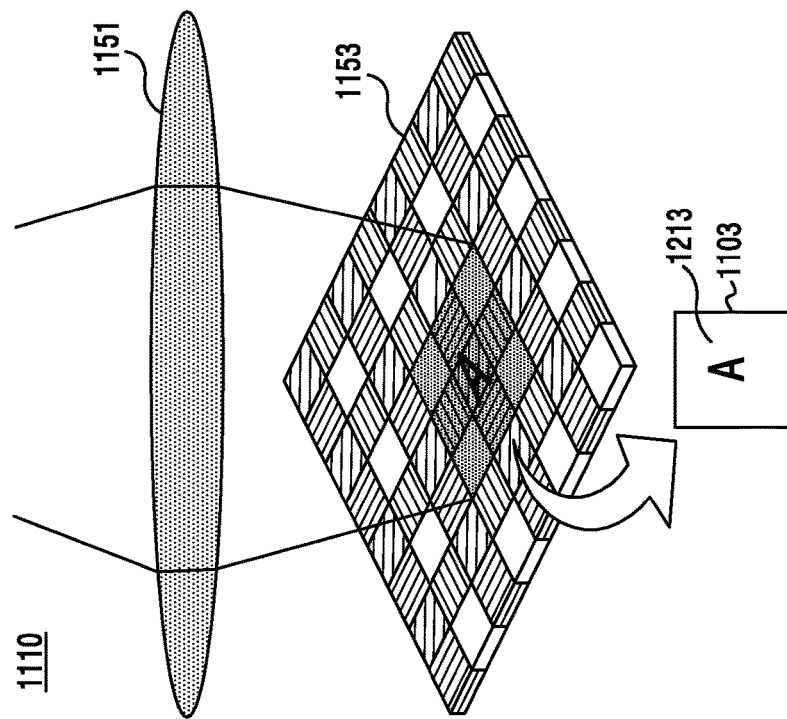
FIGS. 11A and 11B illustrate an operational method of an electronic device according to an embodiment of the present disclosure.
Figure 11A:
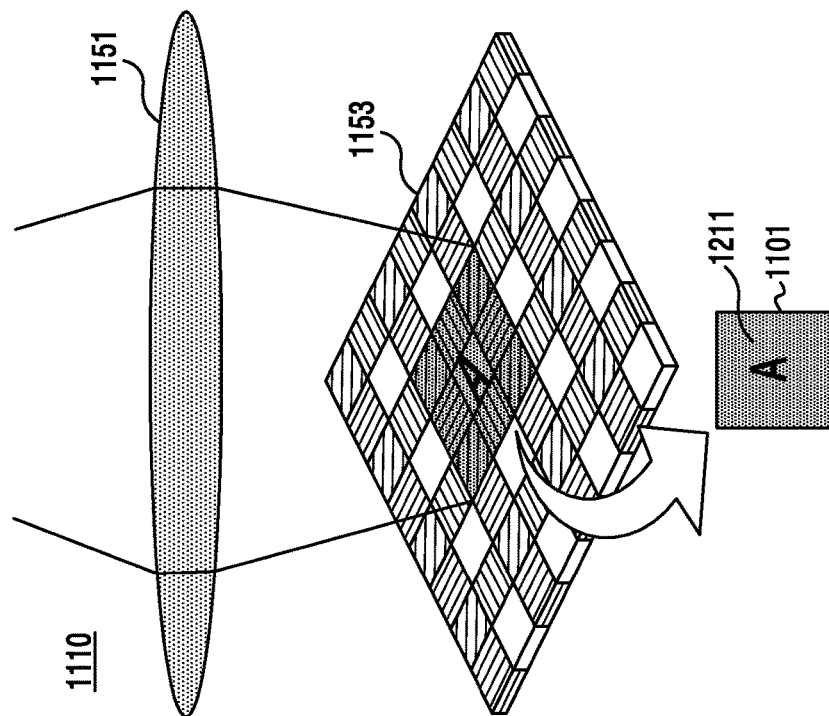

FIGS. 11A and 11B are diagrams illustrating an operational method of an electronic device according to an embodiment of the present disclosure. FIGS. 12 to 21 are diagrams illustrating an operational method of an electronic device according to an embodiment of the present disclosure.

Referring to FIG. 11A, the electronic device (e.g., an image sensor module 1110) may obtain, from a lens 1151, a first image 1101 that corresponds to an external object. The first image 1101 includes first color information 1211.

Through the movement of the lens 1151 or the image sensor 1153, based on a pixel unit from the first image sensor 1101, a second image 1103 may be obtained, as illustrated in FIG. 11B. The second image 1103 includes second color information 1213.

FIG. 12A illustrates a pixel array that is included in an image sensor. The pixel array includes an RGBW pixel unit 823.

More specifically, the pixel array includes multiple RGBW pixel unit 823, where each pixel unit includes one R pixel, one G pixel, one B pixel, and one W pixel.

When first photographing corresponding to the external object is performed, the first image 1101 including the first color information 1211 as illustrated in FIG. 12B may be obtained from pixels 1201. The electronic device may move the lens or the image sensor in the 3 o'clock direction and the 6 o'clock direction based on a 1-pixel unit, by using an actuator.

When second photographing corresponding to the external object is performed after the pixel movement, the second image 1103 including the second color information 1213 may be obtained from pixels 1203.

The first color information 1211 includes G(−1,1) color information corresponding to G(−1,1) pixel, R(0,1) color information corresponding to R(0,1) pixel, B(−1,0) color information corresponding to B(−1,0) pixel, and W(0,0) color information corresponding to W(0,0) pixel.

The second color information 1213 includes W'(0,0) color information corresponding to W(0,0) pixel, B'(1,0) color information corresponding to pixel B(1,0) pixel, R'(0,−1) color information corresponding to R(0,−1) pixel, and G'(1,−1) color information corresponding to pixel G(1,−1).

The W(0,0) color information of the first image 1101 is located in a location corresponding to the G'(1,−1) color information of the second image 1103, and the electronic device (e.g., an image processing module thereof) may perform processing by replacing the W(0,0) color information with the G'(1,−1) color information or combining the W(0,0) color information and the G'(1,−1) color information. For example, the electronic device may generate a third image 1235 having third color information 1237, as illustrated in FIG. 12F, by combining at least some of the first color information 1211 and at least some of the second color information 1213, thereby improving color resolution and color reproduction.

The electronic device may also move a lens or an image sensor 513 based on a pixel unit by using an actuator so that at least some of the second color information 1213 includes color information that is different from at least some of the first color information 1211. For example, when the first color information 1211 includes W color information, which is white information, the electronic device may move the lens or the image sensor based on a pixel unit by using the actuator so that at least some of the second color information 1213 includes R color information, G color information, or B color information.

The electronic device may also move the lens or the image sensor based on a designated pixel unit by using the actuator so that at least some of the second color information 1213 includes color information that is substantially the same as (or identical to) at least some of the first color information 1211.

Alternatively, the electronic device may move, by using the actuator, based on a pixel unit, in a direction in which color information that is useful for the processing performed in the image processing module is generated. For example, as illustrated in FIG. 12, when the image sensor includes the RGBW pixel unit 823, the electronic device may move based on a pixel unit so that the third color information 1237 generated after pixel movement includes color information of an RGB Bayer pattern.

The image processing module may convert the RGB color information of the third image into YUV data. For example, when an image sensor is a YUV sensor, the image processing module may convert a YUV signal into RGB data.

FIGS. 13A to 13F illustrate an operational method of an electronic device according to an embodiment of the present disclosure.

Figures 13A, 13B, 13C, 13D, 13E, 13F:
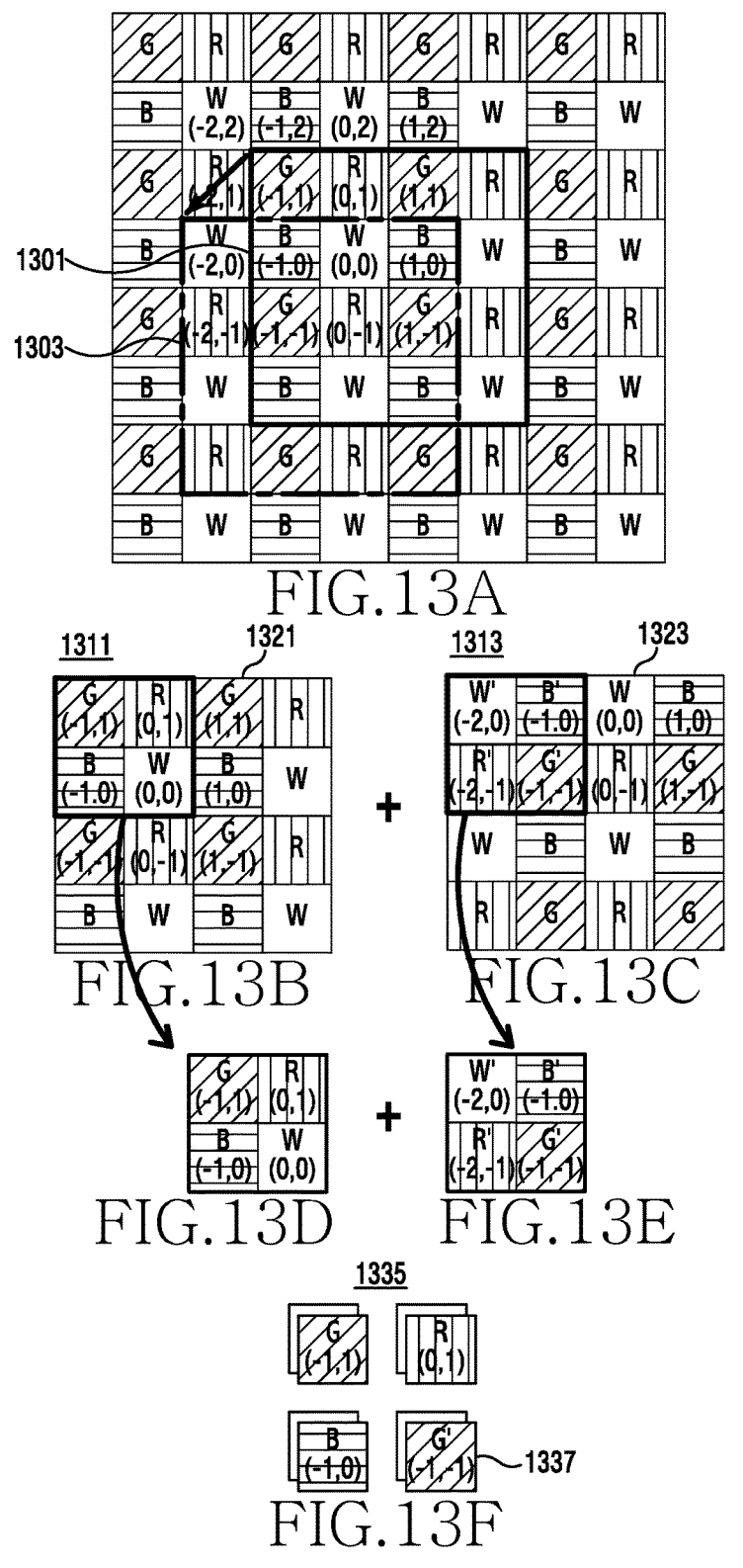

Referring to FIG. 13A, when first photographing corresponding to the external object is performed, the electronic device may obtain a first image 1311 having first color information 1321, as illustrated in FIG. 13B, from pixels 1301. The electronic device may move the lens or the image sensor, by using the actuator, in the 9 o'clock direction and the 6 o'clock direction, based on a 1-pixel unit.

When second photographing corresponding to the external object is performed based on the pixel movement, the electronic device may obtain a second image 1313 having second color information 1323, as illustrated in FIG. 13C, from pixels 1303.

The W(0,0) color information of the first image 1311 is located in a location corresponding to the G'(−1,−1) color information of the second image 1313, and the electronic device (e.g., an image processing module thereof) may perform processing by replacing the W(0,0) color information with the G'(−1,−1) color information or combining the W(0,0) color information and the G'(−1,−1) color information. For example, the electronic device may generate a third image 1335 having third color information 1337, as illustrated in FIG. 13F.

FIGS. 14A to 14F illustrate an operational method of an electronic device according to an embodiment of the present disclosure.

Figure 14A:
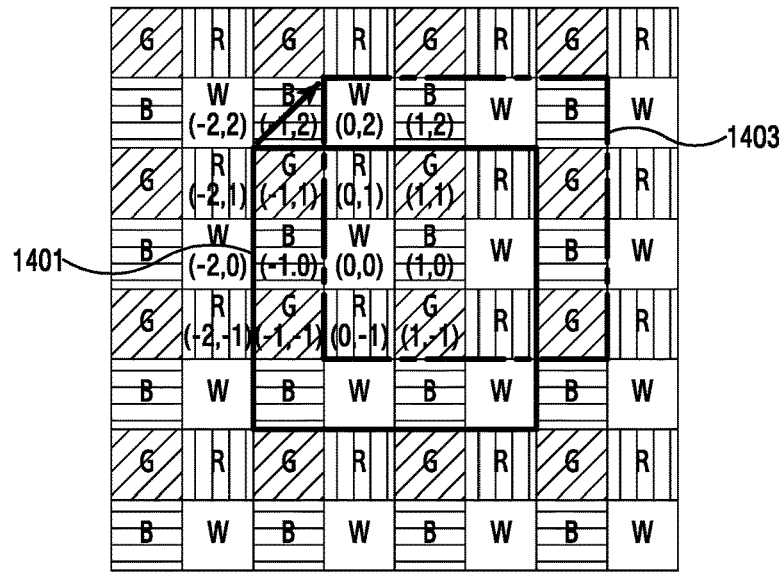
FIGS. 14A to 14F illustrate an operational method of an electronic device according to an embodiment of the present disclosure.
Figures 14B, 14C:
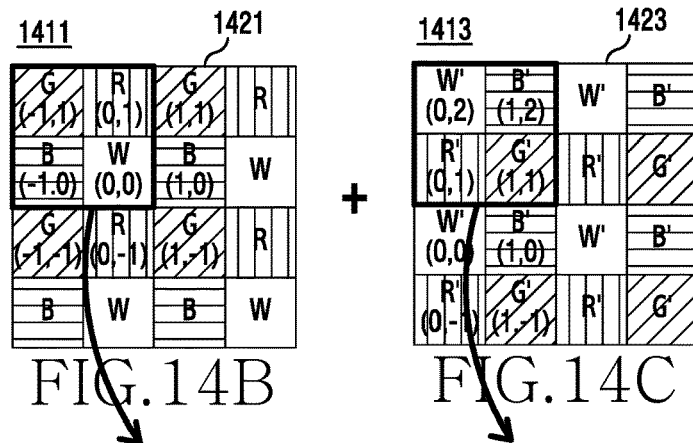
Figures 14D, 14E:
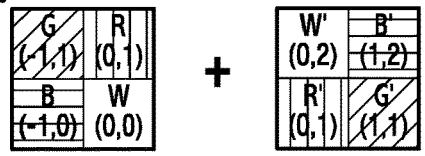

Referring to FIG. 14A, when first photographing corresponding to the external object is performed, the electronic device may obtain a first image 1411 having first color information 1421, as illustrated in FIG. 14B, from pixels 1401. The electronic device may move the lens or the image sensor, by using the actuator, in the 3 o'clock direction and the 12 o'clock direction, based on a 1-pixel unit.

When second photographing corresponding to the external object is performed based on the pixel movement, the electronic device may obtain a second image 1413 having second color information 1423, as illustrated in FIG. 14C, from pixels 1403.

Figure 14F:
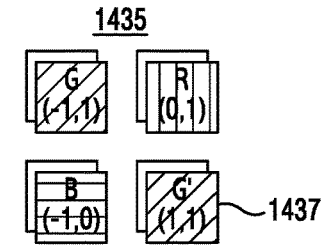

The W(0,0) color information of the first image 1411 is located in a location corresponding to the G'(1,1) color information of the second image 1413, and the electronic device (e.g., an image processing module thereof) may perform processing by replacing the W(0,0) color information with the G'(1,1) color information or combining the W(0,0) color information and the G'(1,1) color information. For example, the electronic device may generate a third image 1435 having third color information 1437, as illustrated in FIG. 14F.

FIGS. 15A to 15F illustrate an operational method of an electronic device according to an embodiment of the present disclosure.

Figures 15A, 15B, 15C, 15D, 15E, 15F:
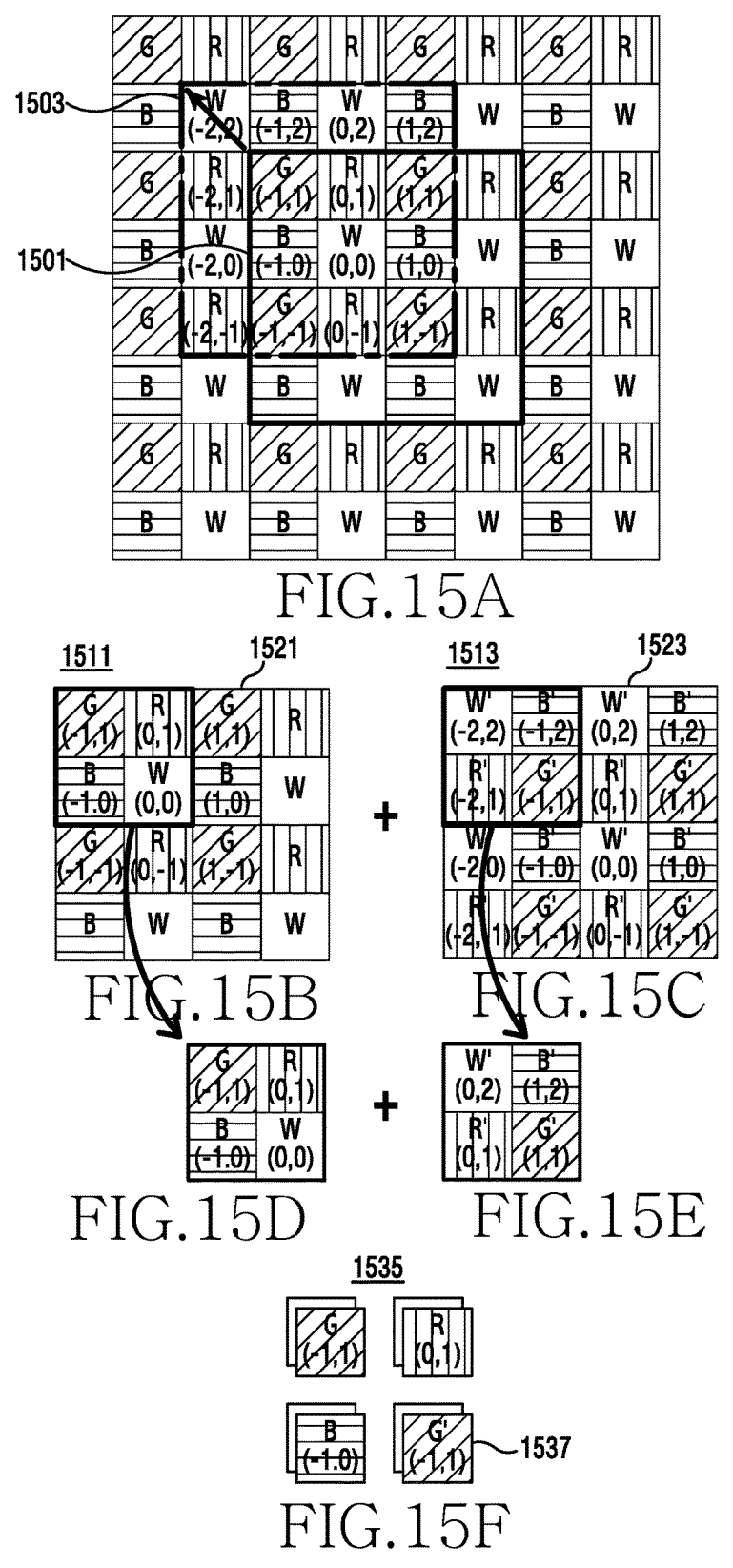

Referring to FIG. 15A, when the electronic device performs first photographing corresponding to the external object, the electronic device may obtain a first image 1511 having first color information 1521, as illustrated in FIG. 15B, from pixels 1501. The electronic device may move the lens or the image sensor, by using the actuator, in the 9 o'clock direction and the 12 o'clock direction, based on a 1-pixel unit.

When second photographing corresponding to the external object is performed based on the pixel movement, the electronic device may obtain a second image 1513 having second color information 1523, as illustrated in FIG. 15C, from pixels 1503.

The W(0,0) color information of the first image 1511 is located in a location corresponding to the G'(−1,1) color information of the second image 1513, and the electronic device (e.g., an image processing module thereof) may perform processing by replacing the W(0,0) color information with the G'(−1,1) color information or combining the W(0,0) color information and the G'(−1,1) color information. For example, the electronic device may generate a third image 1535 having third color information 1537, as illustrated in FIG. 15F.

Figure 16A:
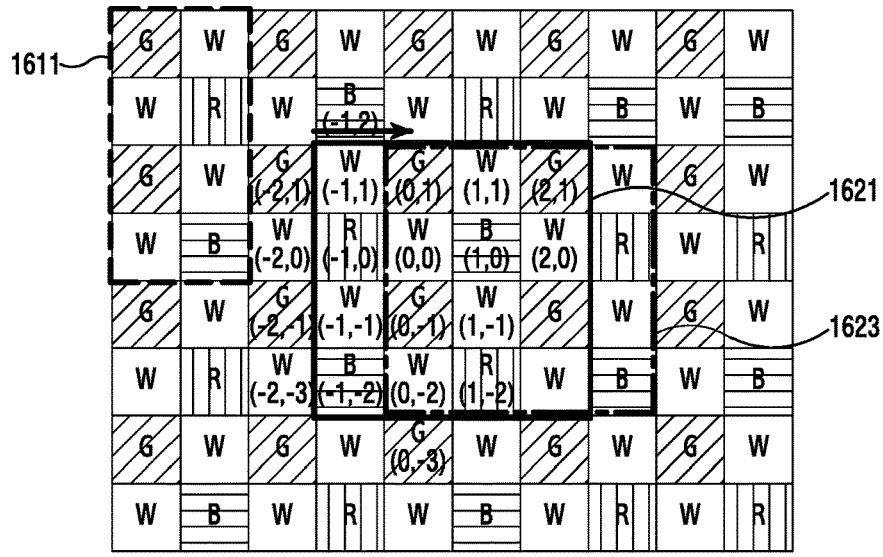
FIGS. 16 to 16D illustrate an operational method of an electronic device according to an embodiment of the present disclosure.
Figures 16B, 16C:
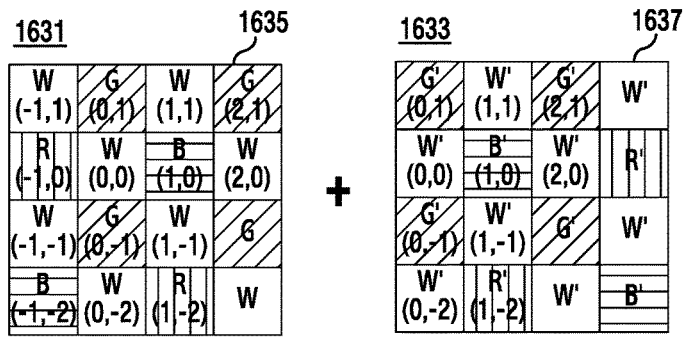
Figure 16D:
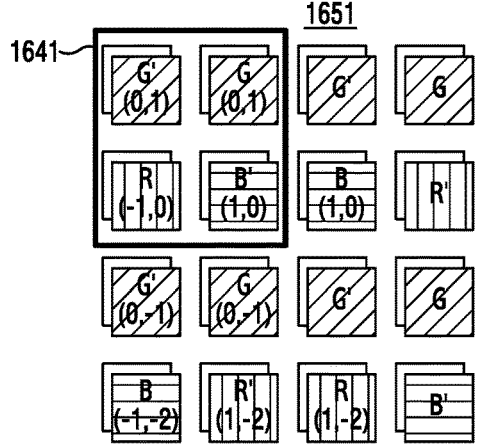

FIGS. 16 to 16D illustrate an operational method of an electronic device according to an embodiment of the present disclosure.

Referring to FIG. 16A, a pixel array, which may be included in an image sensor, includes an RGBW pixel unit 1611. Specifically, the pixel array includes multiple RGBW pixel units 1611, each including one R pixel, two G pixels, one B pixel and four W pixels.

When first photographing corresponding to the external object is performed, the electronic device may obtain a first image 1631 having first color information 1635, as illustrated in FIG. 16B, from pixels 1621. The electronic device may move the lens or the image sensor in the 3 o'clock direction by one pixel, by using the actuator.

When second photographing corresponding to the external object is performed based on the pixel movement, the electronic device may obtain a second image 1633 having second color information 1637, as illustrated in FIG. 16C, from pixels 1623.

The first color information 1635 includes W(−1,1) color information corresponding to W(−1,1) pixel, W(0,0) color information corresponding to W(0,0) pixel, W(−1,−1) color information corresponding to W(−1,−1) pixel, and W(0,−2) color information corresponding to W(0,−2) pixel.

The W(−1,1) color information, the W(0,0) color information, the W(−1,−1) color information, and W(0,−2) color information of the first color information 1635 associated with the first image 1631 may correspond to G'(0,1) color information, B'(1,0) color information, G'(0,−1) color information, and R'(1,−2) color information of the second color information 1637 associated with the second image 1633, respectively. Accordingly, as illustrated in FIG. 16D, an image processing module may perform processing by replacing or combining W(−1,1) color information with G'(0,1) color information, W(0,0) color information with B'(1,0) color information, W(−1,−1) color information with G'(0,−1) color information, and W(0,−2) color information with R'(1,−2) color information, respectively. For example, the image processing module may generate a third image 1651 by generating third color information 1641 including color information of an RGB Bayer pattern.

FIGS. 17A to 17D illustrate an operational method of an electronic device according to an embodiment of the present disclosure.

Figures 17A, 17D:

Referring to FIG. 17A, when first photographing corresponding to the external object is performed, the electronic device may obtain a first image 1731 having first color information 1735, as illustrated in FIG. 17B, from pixels 1721. The electronic device may move the lens or the image sensor in the 9 o'clock direction by one pixel, by using the actuator.

When second photographing corresponding to the external object is performed based on the pixel movement, the electronic device may obtain a second image 1733 having second color information 1737, as illustrated in FIG. 17C, from pixels 1723.

The W(−1,1) color information, the W(0,0) color information, the W(−1,−1) color information, and W(0,−2) color information of the first color information 1735 associated with the first image 1731 may correspond to G'(−2,1) color information, R'(−1,0) color information, G' (−2,−1) color information, and B'(−1,−2) color information of the second color information 1737 associated with the second image 1733, respectively. Accordingly, as illustrated in FIG. 17D, the image processing module 405 may perform processing by replacing or combining W(−1,1) color information with G'(−2,1) color information, W(0,0) color information with R'(−1,0) color information, W(−1,−1) color information with G'(−2,−1) color information, and W(0,−2) color information with B'(−1,−2) color information, respectively. For example, the image processing module 405 may generate a third image 1751 by generating third color information 1741 including color information of an RGB Bayer pattern.

FIGS. 18A to 18D illustrate an operational method of an electronic device according to an embodiment of the present disclosure.

Figure 18A:
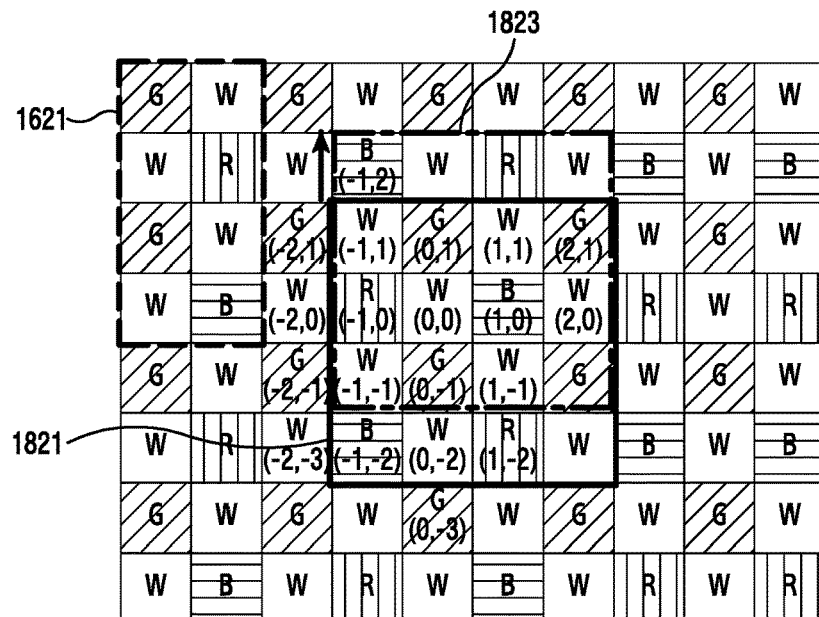
FIGS. 18A to 18D illustrate an operational method of an electronic device according to an embodiment of the present disclosure.
Figures 18B, 18C:
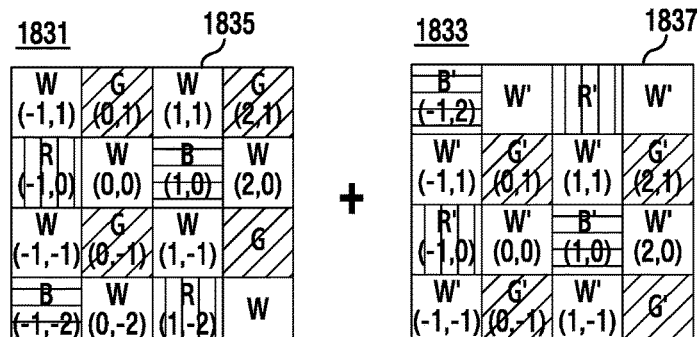

Referring to FIG. 18A, when first photographing corresponding to the external object is performed, the electronic device may obtain a first image 1831 having first color information 1835, as illustrated in FIG. 18B, from pixels 1821. The electronic device may move the lens or the image sensor in the 12 o'clock direction by one pixel, by using the actuator.

When second photographing corresponding to the external object is performed based on the pixel movement, the electronic device may obtain a second image 1833 having second color information 1837, as illustrated in FIG. 18C, from pixels 1823.

Figure 18D:
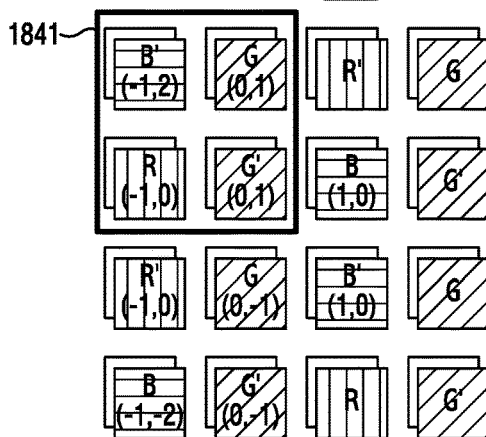

The W(−1,1) color information, the W(0,0) color information, the W(−1,−1) color information, and W(0,−2) color information of the first color information 1835 associated with the first image 1831 may correspond to B'(−1,2) color information, G'(0,1) color information, R'(−1,0) color information, and G'(0,−1) color information of the second color information 1837 associated with the second image 1833, respectively. Accordingly, as illustrated in FIG. 18D, the image processing module 405 may perform processing by replacing or combining W(−1,1) color information with B'(−1,2) color information, W(0,0) color information with G'(0,1) color information, W(−1,−1) color information with R'(−1,0) color information, and W(0,−2) color information with G'(0,−1) color information, respectively. For example, the image processing module 405 may generate a third image 1851 by generating third color information 1841 including color information of an RGB Bayer pattern.

FIGS. 19A to 19D illustrate an operational method of an electronic device according to an embodiment of the present disclosure.

Figure 19A:
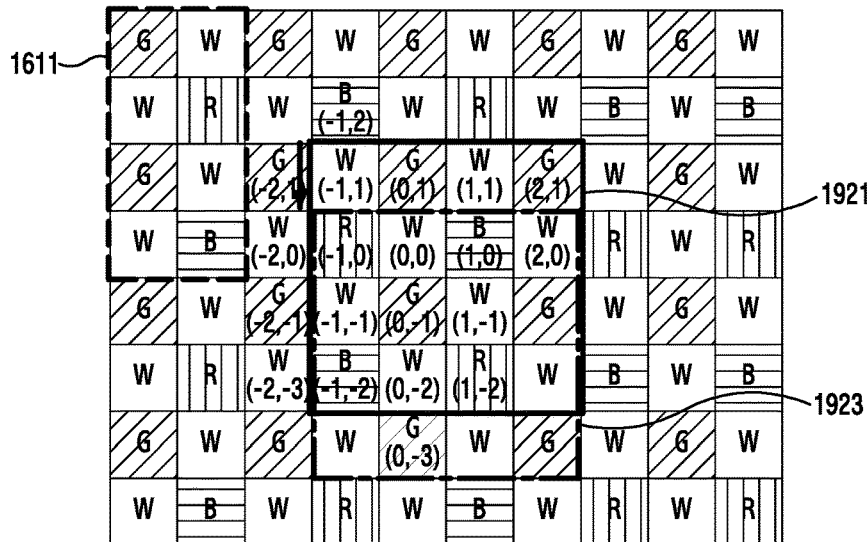
FIGS. 19A to 19D illustrate an operational method of an electronic device according to an embodiment of the present disclosure.
Figures 19B, 19C:
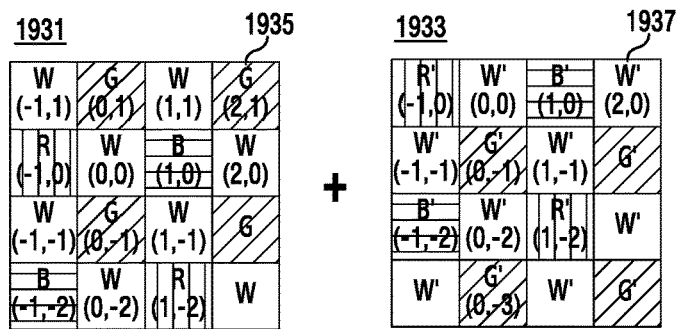

Referring to FIG. 19A, when first photographing corresponding to the external object is performed, the electronic device may obtain a first image 1931 having first color information 1935, as illustrated in FIG. 19B, from pixels 1921. The electronic device may move the lens or the image sensor in the 6 o'clock direction by one pixel, by using the actuator.

When second photographing corresponding to the external object is performed based on the pixel movement, the electronic device may obtain a second image 1933 having second color information 1937, as illustrated in FIG. 19C, from pixels 1923.

Figure 19D:
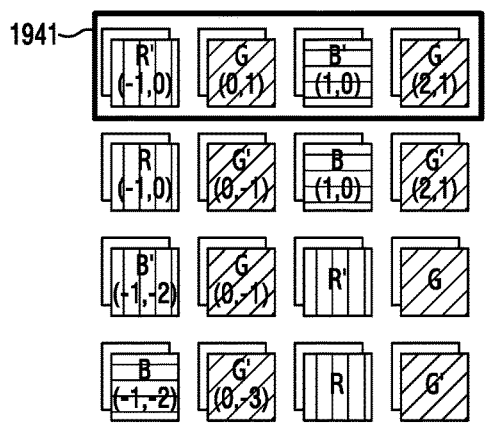

The W(−1,1) color information, the W(0,0) color information, the W(1,1) color information, and W(2,0) color information of the first color information 1935 associated with the first image 1931 may correspond to R'(−1,0) color information, G'(0,−1) color information, B'(1,0) color information, and G'(2,1) color information of the second color information 1937 associated with the second image 1933, respectively. Accordingly, as illustrated in FIG. 19D, the image processing module 405 may perform processing by replacing or combining W(−1,1) color information with B'(−1,2) color information, W(0,0) color information with G'(0,−1) color information, W(1,1) color information with B'(1,0) color information, and W(2,0) color information with G'(2,1) color information, respectively. For example, the image processing module 405 may generate a third image 1951 by generating third color information 1941 including color information of an RGB Bayer pattern.

Although it is illustrated that processing is performed by replacing W color information of the first color information 1635, 1735, 1835, and 1935 with R color information, G color information, or B color information of the second color information 1637, 1737, 1837, and 1937, the present disclosure may not be limited thereto. For example, processing may also be performed by replacing W color information of the second color information 1637, 1737, 1837, and 1937 with R color information, G color information, or B color information of the first color information 1635, 1735, 1835, and 1935.

Additionally, although it is illustrated that a third image is generated after two images are obtained by performing photographing two times, the present disclosure may not be limited thereto. For example, the third image may be generated after a plurality of images are obtained by performing photographing more than two times. For example, processing may be performed by replacing or combining a single piece of W color information with multiple pieces of color information by using multiple images.

FIGS. 20A to 20E illustrate an operational method of an electronic device according to an embodiment of the present disclosure.

Referring to FIG. 20A, a pixel array includes an RBW pixel unit 2011. Specifically, the pixel array includes multiple RBW pixel units 2011, each including one R pixel, one B pixel, and two W pixels.

When first photographing corresponding to the external object is performed, the electronic device may obtain a first image 2021 having first color information 2041, as illustrated in FIG. 20B, from pixels 2031. The electronic device 101 may move the lens or the image sensor in the 3 o'clock direction by one pixel, by using the actuator, as illustrated in FIG. 20C.

When second photographing corresponding to the external object is performed based on the pixel movement, the electronic device may obtain a second image 2023 having second color information 2043, as illustrated in FIG. 20D, from pixels 2033. The electronic device (e.g., an image processing module therein) may replace or combine W color information included in the first color information 2041 with R color information or B color information corresponding to the second color information 2043. Accordingly, third color information 2053, as illustrated in FIG. 20E, may be generated and a third image 2051 may be generated.

FIGS. 21A to 21E illustrate an operational method of an electronic device according to an embodiment of the present disclosure.

Referring to FIG. 21A, a pixel array includes a CMY pixel unit 2111. Specifically, the pixel array includes multiple CMY pixel units 2111, each including one R pixel, one B pixel, one C pixel, and one Y pixel.

When first photographing corresponding to the external object is performed, the electronic device may obtain a first image 2121 having first color information 2141, as illustrated in FIG. 21B, from pixels 2131.

As illustrated in FIG. 21C, the electronic device may move the lens or the image sensor in the 6 o'clock direction by one pixel, by using the actuator.

When second photographing corresponding to the external object is performed based on the pixel movement, the electronic device may obtain a second image 2123 having second color information 2143, as illustrated in FIG. 21D, from pixels 2133. The electronic device (e.g., an image processing module therein) may replace or combine C color information and Y color information included in the first color information 2141 with R color information or B color information corresponding to the second color information 2143. Accordingly, a third image 2151 having third color information 2153, as illustrated in FIG. 21E, may be generated.

For example, G color information may be detected using Equation (1) or Equation (2), as provided below. Further, R color information may be detected using Equation (3), as provided below.

$$G = Y - R \tag{1}$$

$$G = C - B \tag{2}$$

$$R = M - B \tag{3}$$

In Equation (1), Y color information is a value obtained by adding G color information and R color information, and thus, G color information may be calculated by subtracting R color information from Y color information.

Alternatively, R color information may be calculated based on Equation (1). R color information may be calculated by subtracting G color information from Y color information.

In Equation (2), C color information is a value obtained by adding G color information and B color information, and thus, G color information may be calculated by subtracting B color information from C color information.

Alternatively, B color information may be calculated from Equation (2). B color information may be calculated by subtracting G color information from C color information.

In Equation (3), M color information is a value obtained by adding R color information and B color information, and thus, R color information may be calculated by subtracting B color information from M color information.

Alternatively, B color information may be calculated based on Equation (3). B color information may be calculated by subtracting R color information from M color information.

Figure 22:
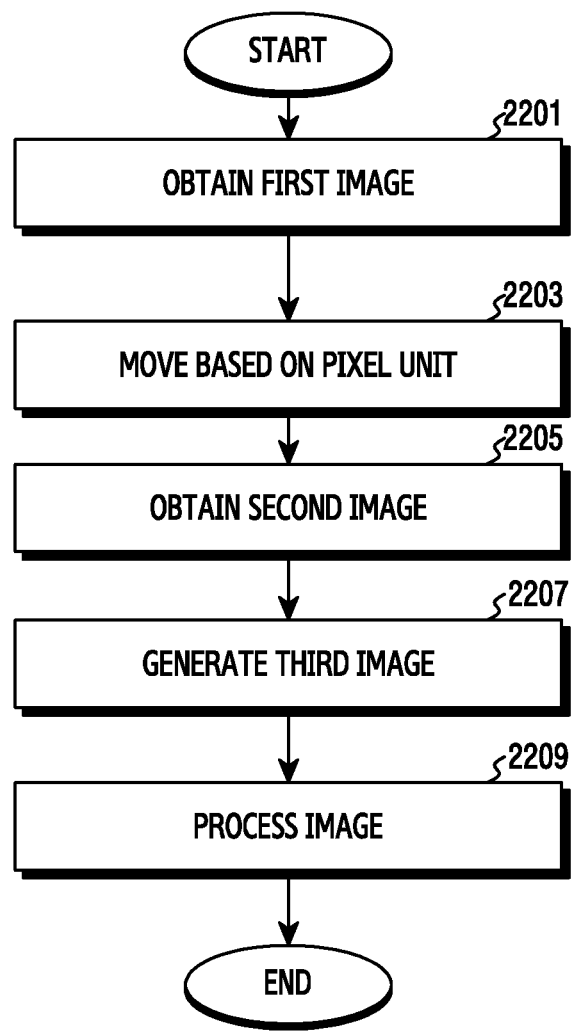
FIG. 22 is a flowchart illustrating an operational method of an electronic device according to an embodiment of the present disclosure.

FIG. 22 is a flowchart illustrating an operational method of an electronic device according to an embodiment of the present disclosure.

Referring to FIG. 22, the electronic device (e.g., an image sensor module therein) obtains a first image having first color information in step 2201.

In step 2203, the electronic device 101 (e.g., a processor therein) moves a lens or an image sensor of the image sensor module based on a designated pixel unit, e.g., by using an actuator. That is, the electronic device may control the actuator to move the lens or the image sensor, based on a designated pixel unit, in order to obtain an image having different color information than the first color information.

For example, when at least some of the first color information includes white information (i.e., when the image sensor module includes a white pixel), the electronic device controls the actuator to move the lens or the image sensor of the image sensor module based on a designated pixel unit so that at least some of the second color information includes color information (e.g., red information, green information, blue information, etc.).

In step 2205, the electronic device obtains a second image having second color information using the image sensor module. The second image corresponds to an image obtained by shifting the first image obtained in step 2201 based on a designated pixel unit. Accordingly, at least some of the second color information includes color information that is different from at least some of the first color information. At least some of the second color information may also include color information that is substantially the same as at least some of the first color information.

In step 2207, the electronic device generates a third image through third color information by combining the first image and the second image. That is, the electronic device combines at least some of the first color information and at least some of the second color information, and generates at least some of third color information.

For example, when the first image and the second image, which is shifted based on a designated pixel unit are combined, white pixel location information of the first image and color pixel information of the second image, which is obtained through pixel shifting, may be combined.

In step 2209, the electronic device processes the obtained third image, e.g., into an image with improved color resolution and/or color reproduction. Also, the electronic device may process the image based on the third image and white pixel information obtained from the first image and/or second image.

Figure 23:
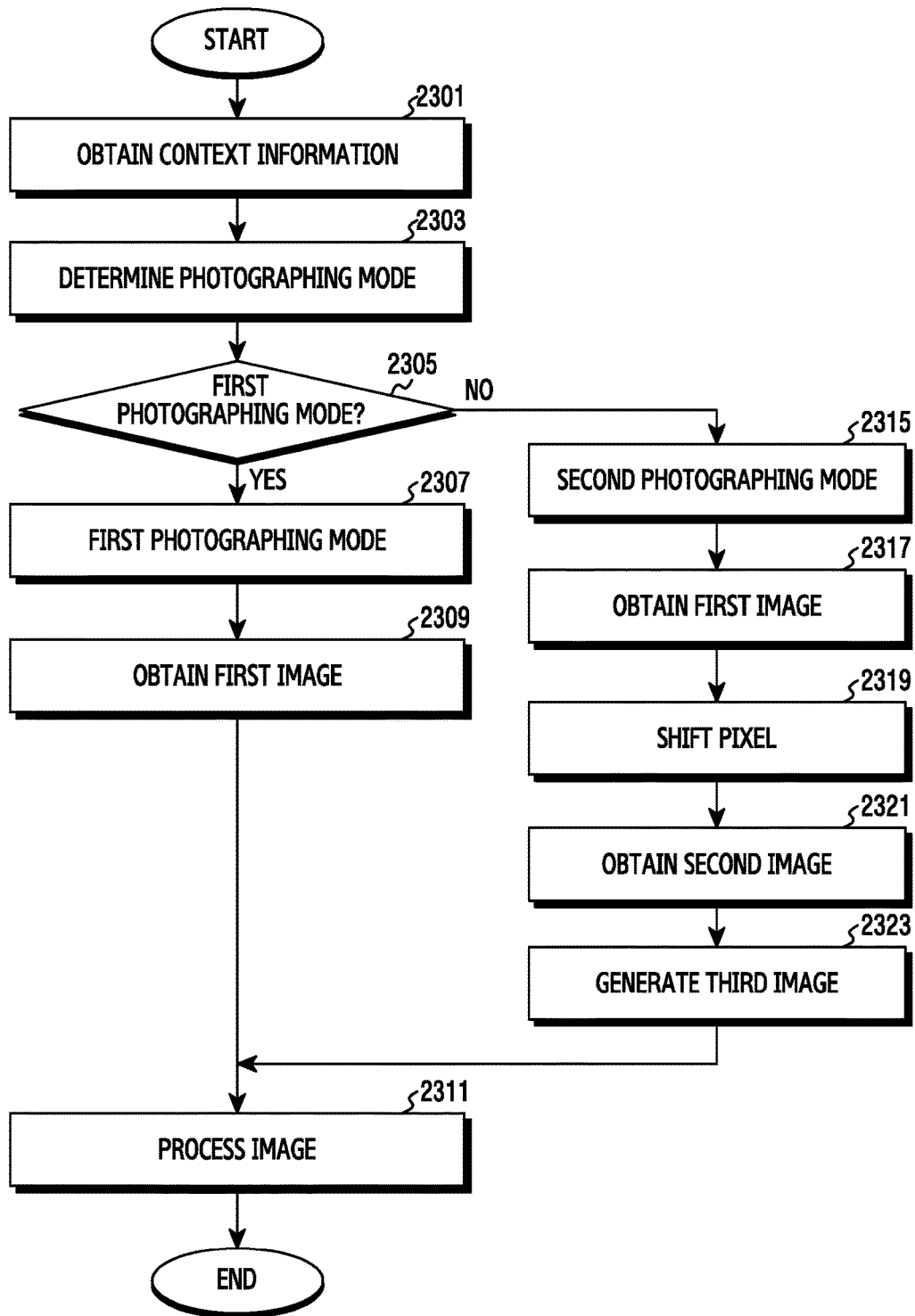
FIG. 23 is a flowchart illustrating an operational method of an electronic device according to an embodiment of the present disclosure.

FIG. 23 is a flowchart illustrating a method of controlling an electronic device according to an embodiment of the present disclosure.

Referring to FIG. 23, the electronic device (e.g., a processor therein) obtains context information in step 2301 That is, the electronic device obtains the property of an external object, settings of an electronic device, and/or context information associated with an environment around the electronic device. For example, the electronic device may determine an illuminance condition, an automatic exposure condition, or a setting condition, and may obtain context information therefrom.

In step 2303, the electronic device determines a photographing mode based on the context information. The electronic device may obtain an image based on a determined photographing mode.

In step 2305, the electronic device determines whether the photographing mode is a first photographing mode.

When the photographing mode is the first photographing mode, the electronic device performs a first photographing mode operation in step 2307, obtains a first image in step 2309, and processes the obtained first image in step 2311.

However, when the photographing mode is different from the first photographing mode in step 2305, the electronic device performs a second photographing mode operation in step 2315. Steps 2317, 2319, 2321, 2323, and 2311 correspond to steps 2201, 2203, 2205, 2207, and 2208, respectively, of FIG. 22.

The features, structures, effects, etc., that have been described above with reference to the above-described embodiments may not be limited to only one embodiment. In addition, the features, structures, effects, etc., which are illustrated in each embodiment may be modified or combined with other embodiments by a person skilled in the field to which the embodiments belong. Therefore, it should be construed that the combination and the modification are included in the scope of the present disclosure.

An electronic device (e.g., an image processing device) according to an above-described embodiment of the present disclosure may improve color reproduction or color resolution of an image that is obtained through an image sensor.

Additionally, an electronic device according to an above-described embodiment of the present disclosure may include an image sensor in which color and white pixels are arranged in a predetermined pattern, may obtain a plurality of images by driving an image sensor module based on a pixel unit, and may provide an image of which color representation is improved by processing the images based on color information.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An image processing device, comprising:
   an image sensor module including a lens and an image sensor;
   an actuator; and
   a processor configured to:
      obtain, using the image sensor module, a first image having first color information, the first image corresponding to an external object;
      move at least one of the lens and the image sensor based on a designated pixel unit;
      obtain, using the image sensor module with the moved at least one of the lens and the image sensor, a second image having second color information, the second image corresponding to the external object;
      generate a third image having third color information based on the first color information and the second color information, the third image corresponding to the external object,
   wherein the processor is further configured to:
      obtain brightness information using the image sensor; and
      obtain the second image based on the sensed brightness information.

2. The image processing device of claim 1, wherein the processor is further configured to:
   obtain at least one of a property of the external object, settings of the image processing device, and context information associated with an environment around the image processing device; and
   dynamically adjust the designated pixel unit based on the at least one of the property of the external object, the settings of the image processing device, and the context information.

3. The image processing device of claim 1, wherein the image sensor comprises a pixel that senses white information.

4. The image processing device of claim 1, wherein the processor is further configured to generate the third color information by combining at least some of the first color information and at least some of the second color information.

5. The image processing device of claim 1,
   wherein the processor is further configured to control the actuator to move the at least one of the lens and the image sensor so that the second color information includes different color information than the first color information.

6. The image processing device of claim 1, wherein the processor is further configured to control the actuator to move the at least one of the lens and the image sensor so that the second color information includes color information that is substantially the same the first color information.

7. The image processing device of claim 1, wherein the processor is further configured to combine white information from the first color information, and one of red information, green information, and blue information from the second color information.

8. The image processing device of claim 1, wherein the processor is further configured to, when the first color information includes cyan color information, magenta color information, or yellow color information, control the actuator to move the at least one of the lens and the image sensor so that the second color information includes red information, green information, or blue information.

9. A method of image processing by an image processing device that includes an image sensor module and a processor, the method comprising:
obtaining, using the image sensor module, which includes a lens and an image sensor, a first image having first color information, the first image corresponding to an external object;
moving at least one of the lens and the image sensor based on a designated pixel unit;
obtaining, using the image sensor module with the moved at least one of the lens and the image sensor, a second image having second color information, the second image corresponding to the external object; and
generating, by using the processor, a third image having third color information based on at least the first color information and the second color information, the third image corresponding to the external object,
wherein obtaining the second image comprises:
obtaining brightness information by using the image sensor; and
obtaining the second image based on the sensed brightness information.

10. The method of claim 9, wherein obtaining the second image comprises:
obtaining at least one of a property of the external object, settings of the image processing device, and context information associated with an environment around the image processing device; and
dynamically adjusting the designated pixel unit based on the at least one of the property of the external object, the settings of the image processing device, and the context information.

11. The method of claim 9, wherein the first image and the second image include white information.

12. The method of claim 9, wherein generating the third image comprises generating the third color information by combining at least some of the first color information and at least some of the second color information.

13. The method of claim 9, wherein the image processing device further comprises an actuator, and
wherein obtaining the second image comprises the processor controlling the actuator to move the at least one of the lens and the image sensor so that the second color information includes color information that is different from the first color information.

14. The method of claim 13, wherein obtaining of the second image comprises the processor controlling the actuator to move the at least one of the lens and the image sensor so that the second color information includes color information that is substantially the same as the first color information.

15. The method of claim 9, wherein generating the third image comprises combining white information from the first color information, and one of red information, green information, and blue information from the second color information.

16. A non-transitory computer readable recording medium that records a program for implementing operations in an image processing device including an image sensor module and a processor, the operations comprising:
obtaining, using the image sensor module, which includes a lens and an image sensor, a first image having first color information, the first image corresponding to an external object;
moving at least one of the lens and the image sensor based on a designated pixel unit;
obtaining, using the image sensor module with the moved at least one of the lens and the image sensor, a second image having second color information, the second image corresponding to the external object;
generating, by using the processor, a third image having third color information based on at least the first color information and the second color information, the third image corresponding to the external object,
wherein obtaining the second image comprises:
obtaining brightness information by using the image sensor; and
obtaining the second image based on the sensed brightness information.

* * * * *